US008448959B1

(12) United States Patent
Pohot

(10) Patent No.: US 8,448,959 B1
(45) Date of Patent: May 28, 2013

(54) TOOLBOX AND TOOL MOUNT FOR AERIAL WORK PLATFORM

(75) Inventor: James Bryan Pohot, Wickenburg, AZ (US)

(73) Assignee: Scissor Works Accessories, LLC, Rock Springs, WY (US)

( * ) Notice: Subject to any disclaimer, the term of this patent is extended or adjusted under 35 U.S.C. 154(b) by 0 days.

(21) Appl. No.: 13/331,319

(22) Filed: Dec. 20, 2011

(51) Int. Cl.
*B62B 1/00* (2006.01)

(52) U.S. Cl.
USPC .................................. 280/47.131; 280/47.19

(58) Field of Classification Search
USPC .................. 280/47.18, 47.27, 47.29, 47.131, 280/47.17, 47.24, 79.2, 130; 220/475, 478, 220/480; 248/129, 133; 211/49.1, 194; 206/349, 206/386, 486, 487, 493, 593
See application file for complete search history.

(56) References Cited

U.S. PATENT DOCUMENTS

| | | | | |
|---|---|---|---|---|
| 4,480,810 | A | 11/1984 | Hall | |
| 5,547,080 | A | 8/1996 | Klimas | |
| 5,647,453 | A | 7/1997 | Cassells | |
| 5,727,649 | A | 3/1998 | Buckley | |
| 5,906,381 | A * | 5/1999 | Hovatter | 280/47.18 |
| 5,967,259 | A | 10/1999 | Williams | |
| 6,000,497 | A | 12/1999 | Kain et al. | |
| 6,412,601 | B1 | 7/2002 | Schmidt | |
| 6,467,577 | B1 | 10/2002 | Charlebois, Jr. | |
| 6,467,744 | B1 | 10/2002 | Calin | |
| 6,536,590 | B1 * | 3/2003 | Godshaw et al. | 206/373 |
| 6,601,674 | B2 | 8/2003 | Murray | |
| 6,837,383 | B1 | 1/2005 | Mcelhaney, Jr. | |
| 7,000,876 | B2 | 2/2006 | Searcy | |
| 7,032,711 | B1 | 4/2006 | Katz et al. | |
| 7,198,511 | B2 * | 4/2007 | Brennan, Jr. | 439/501 |
| D550,007 | S | 9/2007 | Westra | |
| 7,264,084 | B1 | 9/2007 | Switzer | |
| 7,275,641 | B1 * | 10/2007 | Purnell | 206/373 |

(Continued)

FOREIGN PATENT DOCUMENTS

| | | |
|---|---|---|
| EP | 931905 | 5/2000 |
| WO | WO2010/139695 | 12/2010 |

OTHER PUBLICATIONS

Power Tool Holder from Lift Buddy 2000; http://equipment.forconstructionpros.com/product/10079381/Lift_Buddy_2000_13 Power_To...; as accessed on Jun. 20, 2011; p. 1.

(Continued)

*Primary Examiner* — John Walters
*Assistant Examiner* — James Triggs
(74) *Attorney, Agent, or Firm* — Thorpe North & Western LLP

(57) ABSTRACT

A toolbox is configured to hang from an upper rail of a guard rail of an aerial work platform, such as a scissor lift or cherry picker. A rail hanger is attached to a chest to removably hook the chest to the upper rail of the guard rail and removably suspend the chest from the upper rail and above the floor of the platform. A pull handle is attached to a top of the rail hanger. A pair of wheels is coupled to a bottom and the back of the chest. The toolbox has a height extending a majority of a height of the guard rail with the pair of wheels suspended above a floor of the platform when the chest is suspended from the upper rail. The toolbox can include a wire dispenser.

23 Claims, 17 Drawing Sheets

U.S. PATENT DOCUMENTS

| | | | | |
|---|---|---|---|---|
| 7,367,571 | B1 * | 5/2008 | Nichols | 280/47.18 |
| 7,370,726 | B1 | 5/2008 | Chavez | |
| 7,374,018 | B1 | 5/2008 | Thurn | |
| 7,658,265 | B1 | 2/2010 | Dooley | |
| 2001/0007343 | A1 | 7/2001 | McElhaney, Jr. | |
| 2002/0117947 | A1 * | 8/2002 | Cheng | 312/327 |
| 2004/0163891 | A1 | 8/2004 | Craig et al. | |
| 2006/0021985 | A1 * | 2/2006 | Jasper | 220/475 |
| 2011/0079467 | A1 | 4/2011 | Mares | |

OTHER PUBLICATIONS

Aerial Tool Bin for Work Platforms; http://www.chdist.com/displayproductdetail.do?skuSearch=3139400&mr:referralID=NA&...; as accessed on Dec. 2, 2011; pp. 1-2.

Duratool Rolling Tool Organizer; http://www.amazon.com/gp/product/B001D0f4HU?ie=UTF8&tak=breadmakers-20&link...; as accessed on Jun. 29, 2011; pp. 1-5.

Sky Caddy Aerial Scissor Left Tool Tray Drywall 3 ft; http://cgi.ebay.com/ws/eBayISAPI.dll?VewItem&item=320657197904&clk_rvr_id=2421...; as accessed on Jun. 20, 2011; pp. 1-3.

JLG Industries' Scissor Lift Accessories; http://www.ecpzone.com/print/ECP-Magazine/JLG-Industries-Scissor-Lift-Accessories/1S...; as accessed on Jun. 20, 2011; pp. 1-2.

ZARGES: Hanging Tool Box; http://www.zarges.com/en/access-technology/products/ladders/ladder-accessories/hanging-...; as accessed Jun. 20, 2011; p. 1.

* cited by examiner

TOOLBOX AND TOOL MOUNT FOR AERIAL WORK PLATFORM

BACKGROUND

1. Field of the Invention

The present invention relates generally to a tool box or other tool accessory for an aerial work platform (AWP).

2. Related Art

Aerial work platforms (AWP), such as scissor lifts and cherry pickers, can elevate workers for temporary, elevated tasks, such as maintenance and construction. Cherry pickers can include one or more booms that can telescope or articulate to elevate and/or translate a platform. Scissor lifts can include a criss-cross support structure to elevate, generally vertically, the platform. Workers can wear work belts to carry tools. Alternatively, tools can be disposed on a floor of the platform; which can create safety and efficiency issues.

Various different tool trays have been proposed. For example, see: Aerial Tool Bin for Work Platforms available from C&H Distributors; Sky Caddy Aerial Scissor Lift Tool Tray available from Ebay®; JLG Industries' Scissor Lift Accessories; Power Tool Holder from Lift Buddy 2000.

SUMMARY OF THE INVENTION

It has been recognized that it would be advantageous to develop a tool box and/or tool system and/or mounting system to removably secure the tool box, tools and/or materials to an aerial work platform or guardrail thereof.

The invention provides a toolbox in combination with an aerial work platform having a floor and a guard rail with an upper rail. The toolbox includes a chest having an upper box with a pivotal lid having a lid top defining a top of the chest, and at least one lower tray disposed under the upper box. A rail hanger is attached to the chest and located at a back and the top of the chest. The rail hanger removably hooks the chest to the upper rail of the guard rail and removably suspends the chest from the upper rail and above the floor of the platform. A pull handle is attached to a top of the rail hanger. A pair of wheels is coupled to a bottom and the back of the chest. The toolbox have a height greater than 35 inches and less than 48 inches from an inside top of the rail hanger to a bottom of the pair of wheels with the chest extending a majority of a height of the guard rail with the pair of wheels suspended above the floor of the platform when the chest is suspended from the upper rail.

In accordance with a more detailed aspect of the present invention, the toolbox can include at least one wire dispenser disposed under the upper box configure to rotatably and resistively hold a spool of wire. The wire dispenser can include a pair of laterally spaced-apart, vertically oriented flanges. A slot can be formed in each of the pair of flanges. A roller bearing with opposite ends can be disposed in the slots and carried by the pair of opposite flanges. The roller is bearing capable of carrying the spool of wire. Upper and lower rods can be movably disposed above and below the flanges, respectively, configured to bear against the spool of wire. A pair of upper arms can be disposed on opposite sides of the wire dispenser with one end pivotally coupled to the wire dispenser and another end coupled to the upper rod so that the upper rod moves and the pair of upper arms pivot. A pair of lower arms can be disposed on opposite sides of the wire dispenser with one end pivotally coupled to the wire dispenser an another end coupled to the lower rod so that the lower rod moves as the pair of lower arms pivot. The wire dispenser can also include means for biasing the upper and lower rods towards the roller bearing, and against the spool of wire.

In accordance with a more detailed aspect of the present invention, the toolbox can be used in conjunction with a separate component base that can include an upper rail hanger hooked on and hanging from the upper rail of the guard rail. A vertical support can be attached to and can extend downwardly from the rail hanger past the lower rail of the guard rail. A lower rail hanger can be slidably and fixably disposed on the vertical support and can engage the lower rail of the guard rail. A receiver mount can be coupled above the upper rail hanger and the vertical support. A mountable accessory can have a coupler being removably coupled to the receiver mount.

In addition, the invention provides a toolbox in combination with an aerial work platform having a floor and a guard rail with an upper rail. The toolbox includes a chest having an upper box with a pivotal lid having a lid top defining a top of the chest and at least one lower tray disposed under the upper box. A rail hanger is attached to the chest and located at a back and the top of the chest. The rail hanger removably hooks the chest to the upper rail of the guard rail and removably suspends the chest from the upper rail and above the floor of the platform. At least one wire dispenser is disposed under the upper box configure to rotatably and resistively hold a spool of wire. The wire dispenser includes a pair of laterally spaced-apart, vertically oriented flanges. A slot is formed in each of the pair of flanges. A roller bearing with opposite ends can be disposed in the slots and carried by the pair of opposite flanges. The roller bearing is capable of carrying the spool of wire. Upper and lower rods are movably disposed above and below the flanges, respectively, configured to bear against the spool of wire. A pair of upper arms is disposed on opposite sides of the wire dispenser with one end pivotally coupled to the wire dispenser and another end coupled to the upper rod so that the upper rod moves and the pair of upper arms pivot. A pair of lower arms is disposed on opposite sides of the wire dispenser with one end pivotally coupled to the wire dispenser and another end coupled to the lower rod so that the lower rod moves as the pair of lower arms pivot. The wire dispenser also includes means for biasing the upper and lower rods towards the roller bearing, and against the spool of wire.

In accordance with a more detailed aspect of the present invention, the toolbox can be used in conjunction with a separate component base that can include an upper rail hanger hooked on and hanging from the upper rail of the guard rail. A vertical support can be attached to and can extend downwardly from the rail hanger past the lower rail of the guard rail. A lower rail hanger can be slidably and fixably disposed on the vertical support and can engage the lower rail of the guard rail. A receiver mount can be coupled above the upper rail hanger and the vertical support. A mountable accessory can have a coupler being removably coupled to the receiver mount.

Furthermore, the invention provides a tool system configured for an aerial work platform having a floor and a guard rail with an upper rail and a lower rail. The tool system includes at least one component base and at least one toolbox or wire dispenser toolbox suspended from the upper rail of the guard rail. The toolbox or the wire dispenser toolbox includes a chest having a box with a pivotal lid having a lid top defining a top of the chest. A rail hanger is attached to the chest and located at a back and the top of the chest. The rail hanger removably hooks the chest to the upper rail of the guard rail and removably suspends the chest from the upper rail and off of the floor of the platform. A pull handle is attached to a top of the rail hanger. A pair of wheels is coupled to a bottom and the back of the chest. The toolbox or wire dispenser has a height extending a majority of a height of the guard rail with the pair of wheels suspended above the floor of the platform when the chest is suspended from the upper rail. The at least one component base includes an upper rail hanger hooked on and hanging from the upper rail of the guard rail. A vertical support is attached to and extends downwardly from the rail hanger past the lower rail of the guard rail. A lower rail hanger is slidably and fixably disposed on the vertical support and engages the lower rail of the guard rail. A receiver mount is coupled above the upper rail hanger and the vertical support. A mountable accessory has a coupler removably coupled to the receiver mount.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "aerial work platform" or AWP is used broadly herein to refer to any type of elevated work platform, including for example, those associated with a ground base, such as a scissor lift or a cherry picker, or even those suspended from above. A scissor lift can have linked, foldable supports in a criss-cross pattern to vertically elevate the work platform; and the platform may even be able to laterally or horizontally translate. A cherry picker can have one or more booms, that can be articulated or telescoping, to vertically elevate and horizontally translate the platform. Such scissor lifts and cherry pickers can be powered and can be include motors to elevate the AWP. In addition, such scissor lifts and cherry pickers can be drivable, while others may be stationary.

The term "support surface" is used broadly herein to refer to a surface upon which something is placed, and can be the ground, a floor, the floor of the platform, etc.

The terms "worker" and "user" are used interchangeably herein to refer to a person who utilizes the AWP and the toolbox or the component base described herein.

The term "tools" is used broadly herein to refer to implements used by a worker, and can include power tools, hand tools, etc.

The term "work materials" is used broadly herein to refer to materials used by a worker, including construction materials, such as pipe, tubing, wiring, panels, drywall, fasteners, cleaning materials, etc., upon which the tools can be used.

The term "toolbox" is used herein to refer to both a toolbox as described herein and a wire dispensing toolbox also as described herein.

DESCRIPTION

Figure 1A:
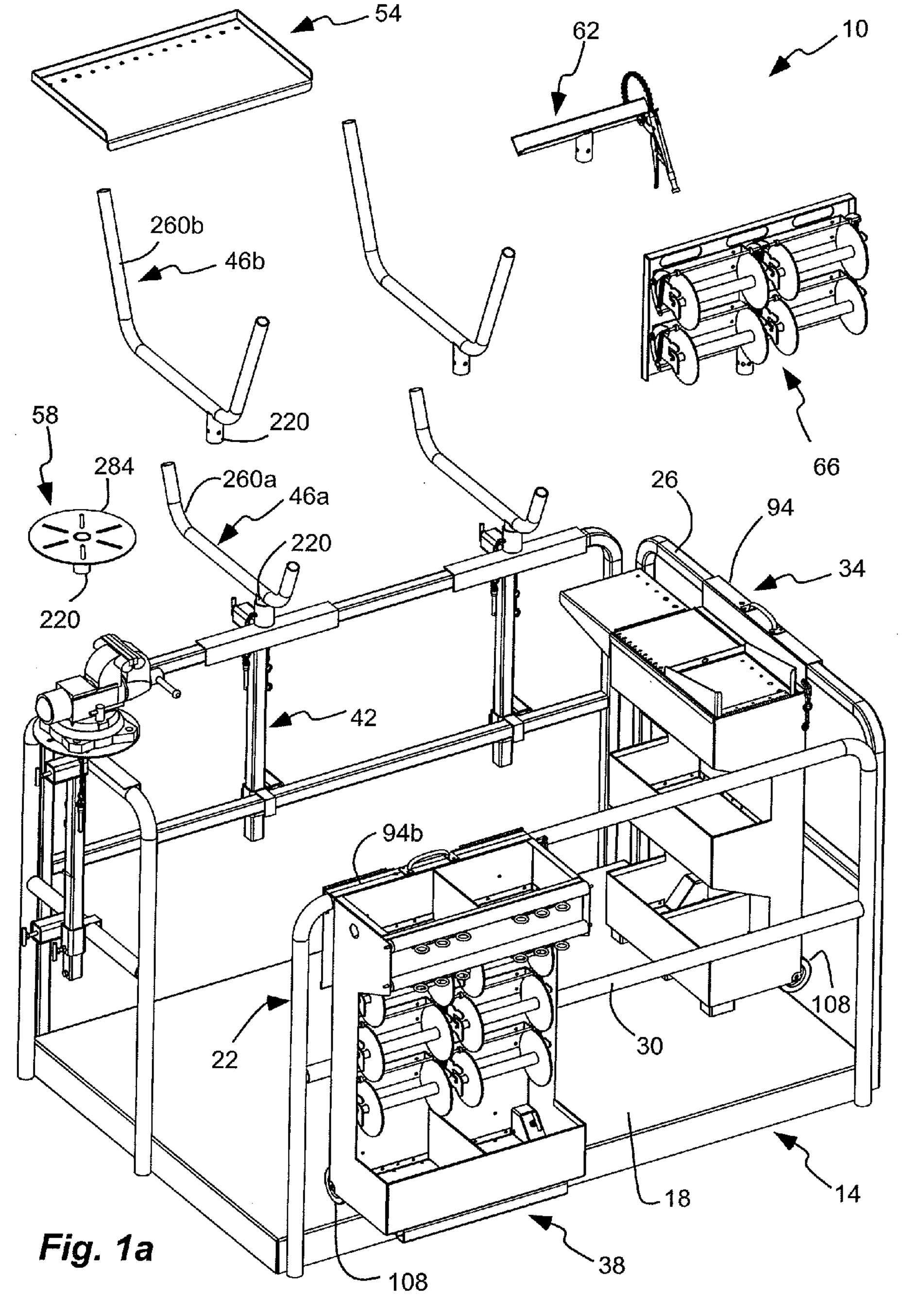
FIG. 1*a* is a perspective view of a portion of a tool system in accordance with an embodiment of the present invention shown with an aerial work platform.
Figure 1B:
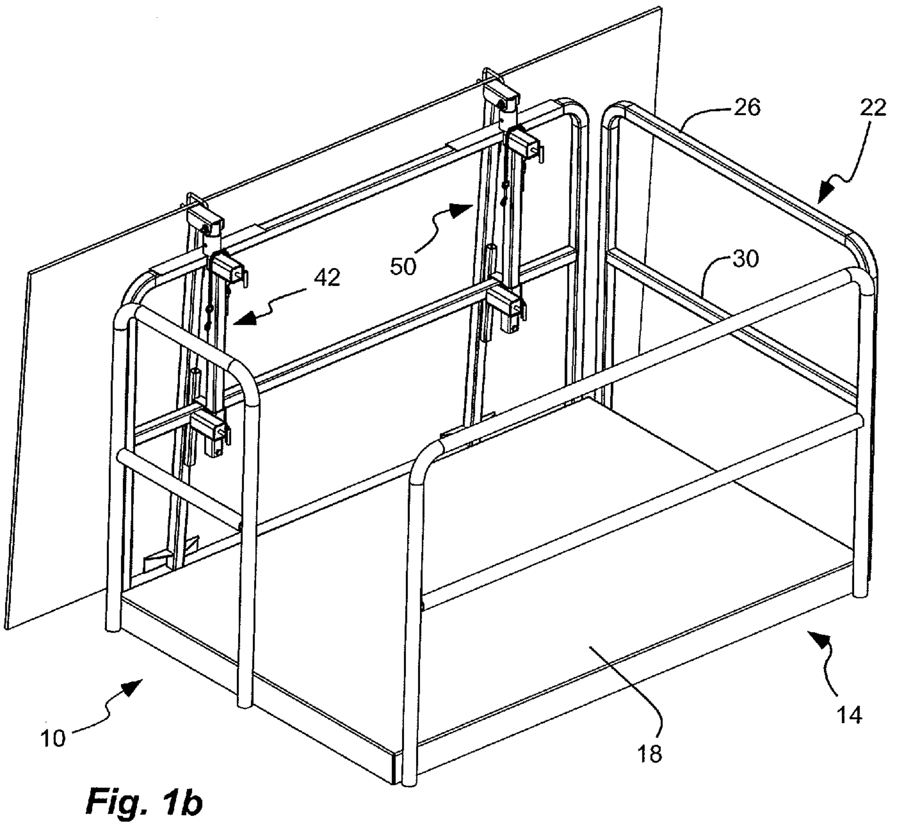
FIG. 1*b* is a perspective view of another portion of the tool system of FIG. 1*a;*
Figure 2A:
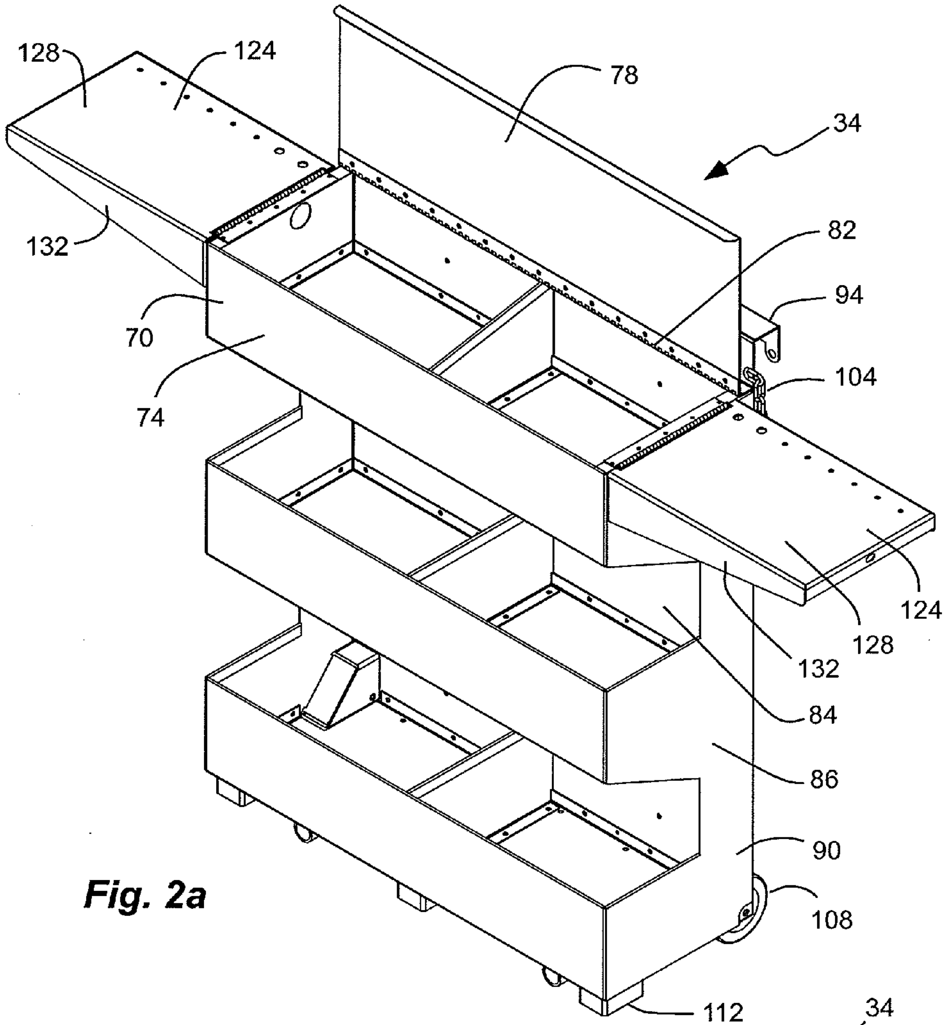
FIG. 2*a* is a perspective view of a toolbox of the tool system of FIGS. 1*a* and 1*b*, shown with a lid in an open position and shelves in an extended position.
Figure 3:
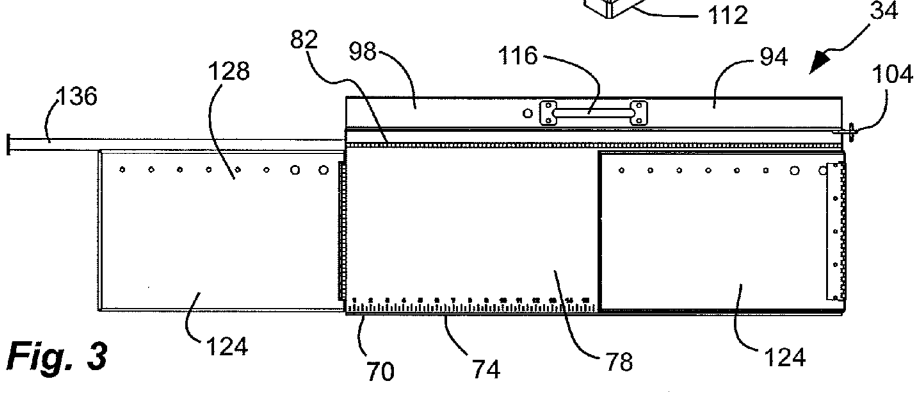
FIG. 3 is a top view of the toolbox of FIG. 2*a*, shown with the lid in a closed position and one shelf in the extended position and another shelf in a folded position, and a rod in an extended position.
Figure 2B:
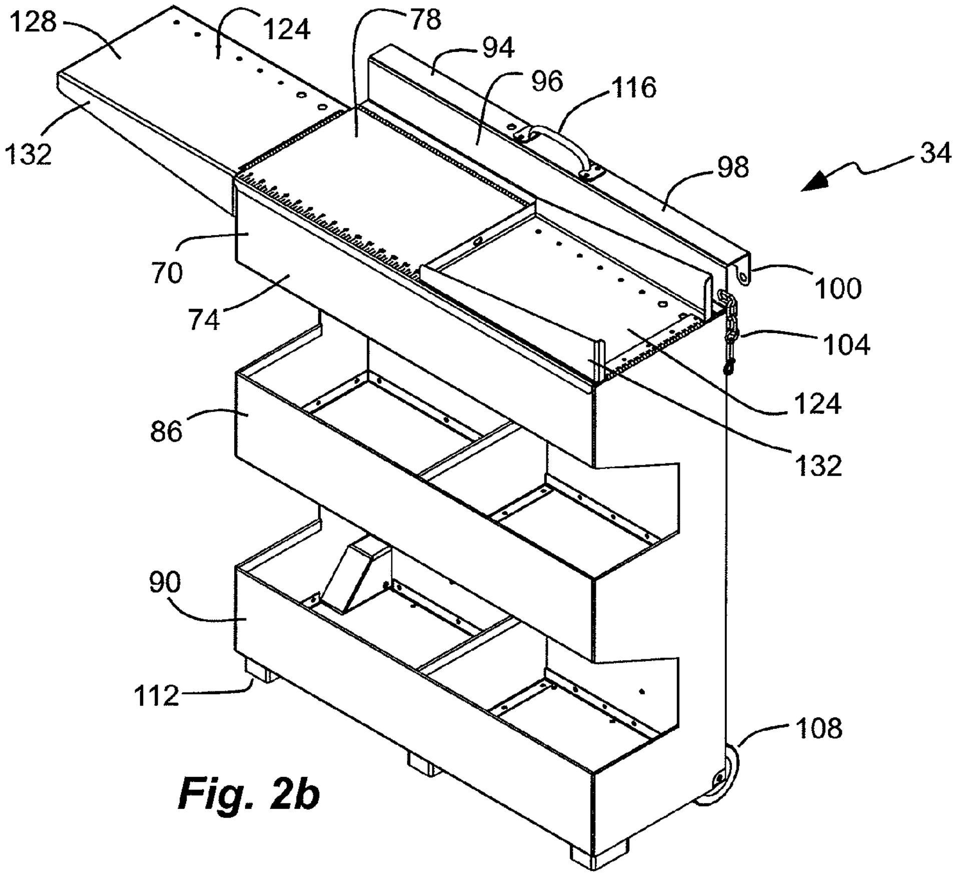
FIG. 2*b* is a perspective view of the toolbox of FIG. 2*a*, shown with the lid in a closed position and one shelf in the extended position and another shelf in a folded position.
Figure 5:
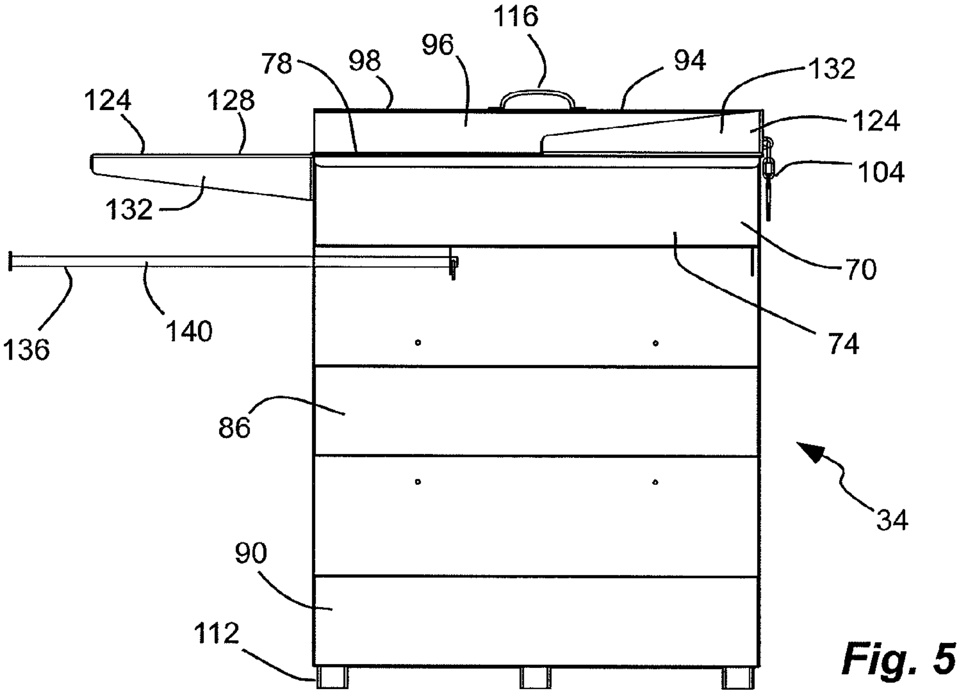
FIG. 5 is a front view of the toolbox of FIG. 2*a*, shown with the lid in a closed position and one shelf in the extended position and another shelf in a folded position, and the rod in an extended position.
Figure 4:
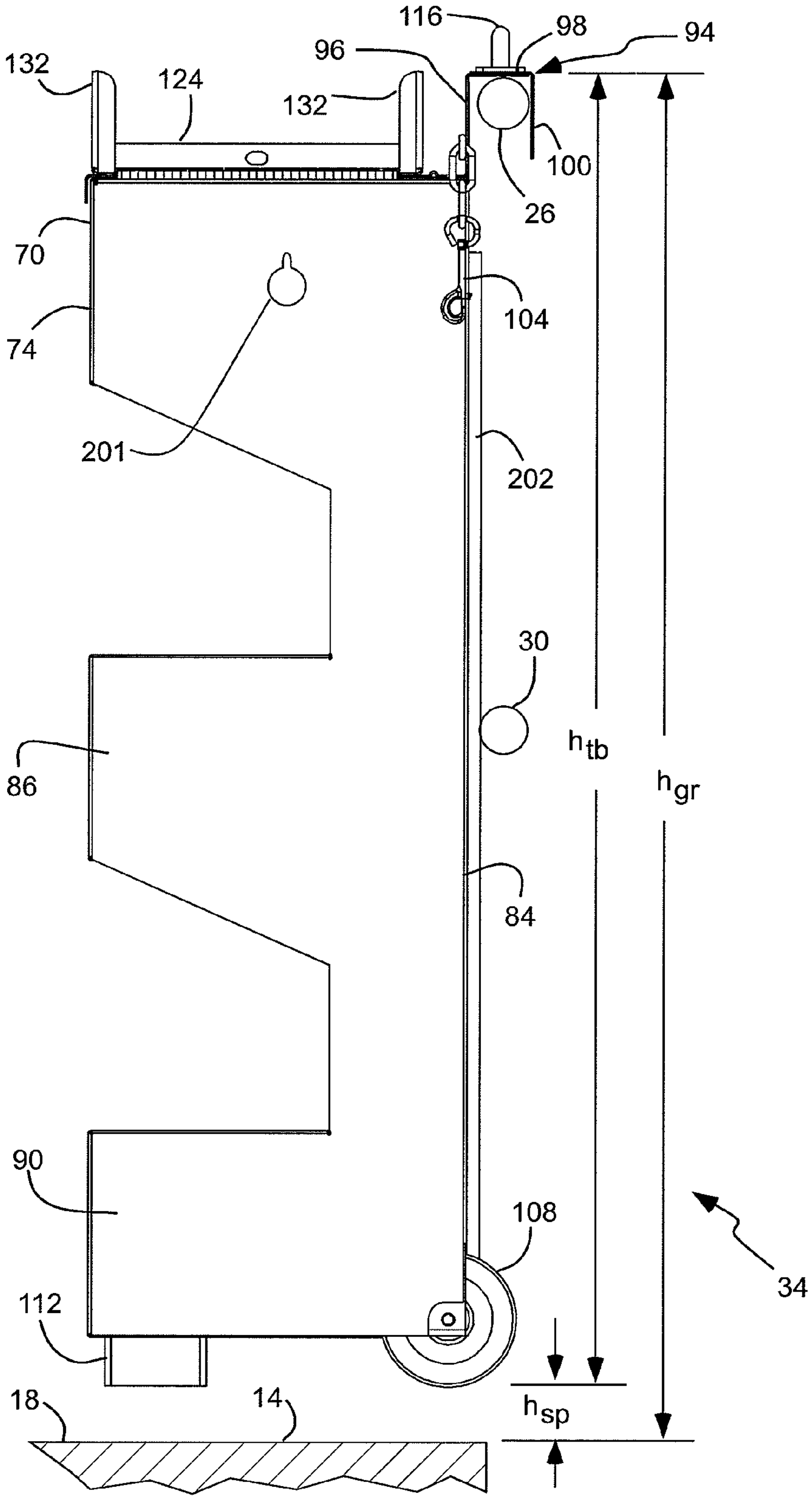
FIG. 4 is a side view of the toolbox of FIG. 2*a*, shown with the lid in a closed position and one shelf the folded position.

As illustrated in FIGS. 1*a* and 1*b*, a tool system, indicated generally at 10, in an example implementation in accordance with the invention is shown in use with an aerial work platform (AWP) 14 having a floor 18 or platform, and a guard rail 22 with an upper rail 26 and a lower rail 30. The floor 18 or platform can be horizontal and attachable to the boom of a cherry picker or the supports of a scissor lift. The floor 18 or platform can be large enough to accommodate a worker, and thus can be rectilinear with a width and a depth in one aspect greater than two feet, and in another aspect greater than three feet. The guard rail 22 can have a height or elevational height $h_{gr}$ (FIG. 4) in one aspect equal to, or greater than, four feet (or 48 inches); and in another aspect equal to, or greater than, three feet (or 36 inches); and in another aspect equal to about 3½ feet (or about 42 inches). The upper rail 26 can be the uppermost rail, while the lower rail 30 can be lower than the upper rail, and can be intermediate the upper rail and the floor. The upper and lower rails can be horizontal and can be supported by vertical columns or posts coupled to the floor. The guard rail 22 can substantially or entirely circumscribe the floor and platform. Thus, the guard rail and the upper and lower rails can be located at a perimeter of the floor or platform. The guard rail 22 can have an opening therein, such as a permanent gap, or a gap closable by a gate, or pivotal or removable guard rail, to allow access to the platform.

As mentioned above, it is common to dispose tools or other work materials on the floor of the platform for use by the worker when the platform is elevated, presenting potential safety hazards and inefficiencies, such as by being inadvertently kicked-off the platform, or inadvertently tripped over. The tool system 10 includes at least one toolbox 34 or wire dispenser toolbox 38. In addition, the tool system 10 can also include at least one component base 42 for mounting another tool or the like. The toolbox 34 or 38 and/or the component base 42 can be carried by the platform, and more specifically the guard rail 22. The toolbox 34 or 38 and/or the component base 42 can be suspended from the guard rail 22 and/or the upper and/or lower rail 26 and 30 thereof. Therefore, the toolbox 34 or 38 and/or the component base 42 can keep tools and work materials off of the floor 18 of the platform 14 to increase or improve safety and efficiency. In addition, the toolbox 34 and/or wire dispenser toolbox 38 can be removable and transportable with respect to the platform and the guard rail. Therefore, the toolbox 34 and/or wire dispenser toolbox 38 can facilitate transportation of tools and/or work materials to a work site, and to an AWP; and can facilitate removal of tools and/or work materials from the work site or AWP for security. Furthermore, the component base 42 can be removed and repositioned with respect to the platform and guard rail, and paired with another component base, to accommodate different tools and work materials, and to customize the configuration of the platform. Therefore, the component base(s) can improve the efficiency of the workspace, and can accommodate different work materials. By way of example, the component base(s) can receive and mount: one or more racks 46*a* or 46*b* for receiving piping, etc.; one or more panel hangers 50 (FIG. 1*b*) for receiving and securing a panel or drywall, etc.; a work top 54; a tool base 58 for mounting a tool, such as a vice; a chain clamp 62 for receiving and securing pipe or tubing, etc.; a wire base 66 for holding wire spools in wire dispensers; etc. The component base(s) can receive other mountable accessories, including tools, work materials, etc.

Referring to FIGS. 2*a*-5, an exemplary toolbox 34 in accordance with the present invention is shown. The toolbox 34 can include a chest 70 with an upper box 74 and a pivotal lid 78. The box 74 can be open at the top, or have an open top, which is covered by the lid 78. The lid 78 can pivot between a closed position (FIGS. 2*b*-5) in which the lid spans the open top of the box and is substantially horizontal, and an open position (FIG. 2*a*) in which the lid is pivoted away from the open top of the box and is substantially vertical. In the closed position, the lid can be substantially horizontal to form a work surface. The lid 78 can be pivotally attached to the box 74 by a hinge 82 located at a back of the box, the chest, the toolbox and the lid. Thus the toolbox, the chest and the box can have a front and a back. The lid can have a lid top defining a top of the chest, and a work surface, in the closed position. Tools and/or work materials can be disposed in the box. The box 74 can be located at, and can define, a top portion of the chest and the toolbox. The box can be defined by a back or back wall 84 of the chest or toolbox, a front wall, lateral side walls, and a bottom wall. The back wall of the chest or toolbox can extend the height of the chest and/or toolbox, while the front wall and sidewalls of the box can be only at the top portion of the chest. In addition, the chest can have at least one lower tray, such as an intermediate tray 86 and a lowermost tray 90, disposed under the upper box 74. The lower tray(s) 86 and 90 can a have open tops. The lower tray(s) can be defined by the back wall of the chest or toolbox, a front wall, lateral side walls, and a bottom wall. The front walls and lateral side walls of the box and the trays can be segmented and/or separated to define openings in the front and/or sides of the chest into the trays. The box and/or trays can be provided with vertical dividers to segment the box and/or trays into compartments within the box and/or trays. The toolbox 34 and/or chest 70 can have a width between 20 and 30 inches, in one aspect; of substantially 20 inches in another aspect; of substantially 24 inches in another aspect; or of substantially 30 inches in another aspect. In addition, the toolbox 34 and/or chest 70 can have a depth of approximately 11 to 12 inches. Furthermore, the toolbox and/or chest can have an elevated height of about 36 inches from the support surface to the lid in the closed position (when the toolbox is disposed on the support surface). An earth magnet can be disposed under and against the lid to magnetize the upper surface of the lid.

The toolbox 34 can also include a rail hanger 94 attached to the chest 70 and located at a back and the top of the chest. The rail hanger 94 can extend a length of the chest and box, and can form an elongated channel or hook with an inverted box J-shape with a vertical flange 96 attached to the chest, a horizontal flange 98 extending therefrom away from the back of the chest and over the upper rail, and a vertical lip 100 extending downwardly therefrom. The flanges 96 and 98 and the lip 100 can form the channel or hook that received the upper rail. The rail hanger, or channel or hook, can have a downward opening so that the rail hanger removably hooks the chest to the upper rail of the guard rail, and is retained thereon by gravity. The rail hanger 94, and flanges and lip thereof, retain the rail hanger on the upper rail, and removably suspend the chest and toolbox from the upper rail, and above the floor of the platform. A safety chain 104 with a clip attached thereto can have one end of the chain coupled to the chest or the rail hanger, and extendable around the upper rail with the clip attached to the end of the chain, the chest or the rail hanger, to further secure the toolbox to the rail guard. Thus, the channel or hook and the chain form a releasable loop around the upper guard rail. The safety chain can further secure the toolbox to the guard rail in the event of a sudden or abrupt movement of the AWP.

As discussed above, the toolbox 34 can be transportable on the ground as well as by the AWP. The toolbox 34 has a pair of wheels 108 coupled to a bottom and the back of the chest 70. The wheels can have an axel located at a bottom and back corner of the chest. Thus, the wheels can be recessed into the chest 70 or lowermost tray 90. The wheels can be disposed at the opposite ends or sides of the chest or tray. One or more feet 112 can be attached to a bottom of the chest 70 or tray 90 near a front of the chest opposite the pair of wheels. Thus, the toolbox 34 can rest on the feet 112 and the wheels 108 when disposed on a support surface (and removed from a suspended configuration on the guard rail). The toolbox 34 can remain at rest on the support surface, and can resist movement thereon due to the feet 112. In addition, the toolbox 34 can move on the support surface by rolling on the wheels 108 without the resistance of the feet by pivoting the toolbox about the axel so that the toolbox rests on the wheels. A pull handle 116 is attached to a top of the rail hanger 94, or the horizontal flange 98 thereof, to allow a worker to grasp, tilt and pull the toolbox to transport the toolbox on the support surface. The pull handle 116 can have an inverted U-shape with a horizontal grip attached to the rail hanger by vertical or inclined posts. Thus, the toolbox 34 and/or chest 70 can have a mobile configuration in which the chest 70 is tilted rearwardly on the pair of wheels 108 and pullable by the handle 116; and a suspended configuration in which the chest 70 is suspended from the upper rail 26 of the guard rail 22 by the rail hanger 94 with the pair of wheels 108, and the feet 112, off of the floor 18 of the platform 14. The toolbox 34 can be hung from the guard rail on an inside of the guard rail or platform, as shown in FIG. 1*a*.

As described above, the toolbox 34 can be suspended from the upper rail 26 of the guard rail 22 so that the pair of wheels 108, and the feet 112, are suspended above and off of the floor 18 of the platform when the toolbox or chest is suspended from the upper rail. In addition, the toolbox 34 can utilize substantially all, or a majority of, the elevational height $h_{gr}$ of the platform or guard rail to store or carry tools and/or work materials in an organized and orderly fashion off of the floor. Thus, the toolbox 34 and/or chest 70 can have a height $h_{tb}$ (FIG. 4), from an inside top of the rail hanger 94 to a bottom of the pair of wheels 108 (and the feet 112), extending a majority of the height $h_{gr}$ of the guard rail 22 or upper rail 26. In one aspect, the toolbox 34 and/or chest 70 can have a height $h_{tb}$, greater than 35 inches and less than 48 inches. In another aspect, the toolbox 34 and/or chest 70 can have a height $h_{tb}$, between 36 and 39 inches. In another aspect, the toolbox 34 and/or chest 70 can have a height $h_{tb}$, of 36 or 39 inches. A gap or space 120 can be disposed between the floor 18 of the platform and the bottom of the toolbox, or the bottom of the wheels 108 and feet 112, with a height $h_{sp}$ that is small relative to the height of the toolbox. In one aspect, the height $h_{sp}$ of the space can be between 1 and 13 inches. In another aspect, the height $h_{sp}$ of the space can be between 1 and 9 inches. In another aspect, the height $h_{sp}$ of the space can be 1 or 9 inches. In another aspect, the height $h_{sp}$ of the space can be about 3 inches. Thus, the lavational height $h_{tb}$ of the toolbox 34 and/or chest 70 can vertically extend over 90% of the height of the guard rail to efficiently utilize the available space on the AWP.

The toolbox 34 and/or chest 70 can also include one or more foldable shelves 124 pivotally coupled to the top of the chest 70 and/or box 74. In one aspect, the toolbox can have one shelf on one side. In another aspect, the toolbox can have a pair of shelves on opposite sides of the box. The shelves 124 can be pivotally coupled to the chest or box by a hinge at the top, lateral sides of the box. The shelves 124 can have an open, extended position, and a closed, retracted or folded position. In the open, extended position, the shelves 124 can have a shelf top 128 substantially flush or level with the top of the lid 78 when when the lid is closed and the shelf is open. In addition, the shelves 124 can have one or more braces 132 extending from the shelf top 128, or the bottom of the shelf top. The braces 132 can be on front and rear sides of the shelf, and can have an end that abuts the lateral side of the chest or the box when the shelf is open to maintain the position of the shelf level or flush with the top of the toolbox or lid. While the braces extend down from the shelves or shelf top in the open position, the braces extend upward in the closed position. Thus, the rail hanger 94 can extend upward above the top of the chest 70, or above the top of the lid 78. The top of the rail hanger can extend above the shelf and the brace thereof when the shelf is folded over the top of the lid. In one aspect, the rail hanger 94 and/or top flange 98 thereof can extend over the top of the chest or lid by three inches. The width of the toolbox with the shelves extended can be between 40 and 60 inches in one aspect; about 40 inches in another aspect; or about 60 inches in another aspect.

The toolbox 34 and/or chest 70 can also have a retractable wire rack or hanger 136. The wire rack or hanger 136 can include a rod 140 disposed under the box 74 and slidable out of an aperture in the lateral side of the chest. A flange can be mounted under the box or bottom thereof with an aperture to receive the rod to hold the rod in a horizontal orientation, and to allow the rod to slide in and out of the chest. Thus, the side of the chest and the flange can provide a pair of apertures for slidably receiving the rod. A stop can be disposed on an inside end of the rod. Thus, the rod can be slid out of the chest to receive one or more spools of wire which can rotate freely on the rod as wire is pulled therefrom. During transportation, the spools can be removed and stored in the tray, and the rod can be slid into the chest. A free end of the rod, opposite from the inside end with the stop, can be enlarged or can also have a removable stop to retail the wire spools on the rod.

Figure 6A:
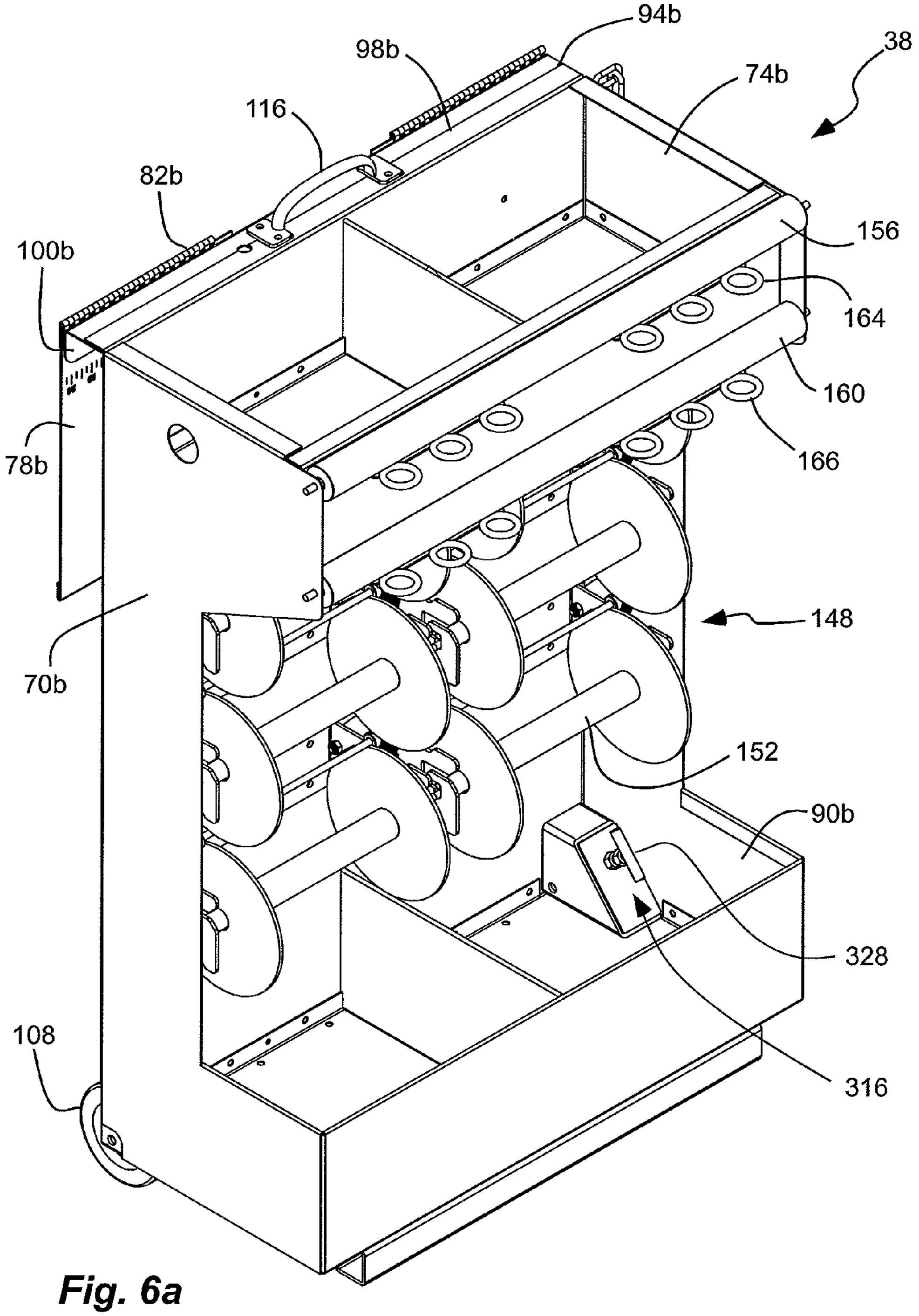
FIG. 6*a* is perspective view of a wire dispenser toolbox of the tool system of FIGS. 1*a* and 1*b*, shown with a lid in an open position.
Figure 6B:
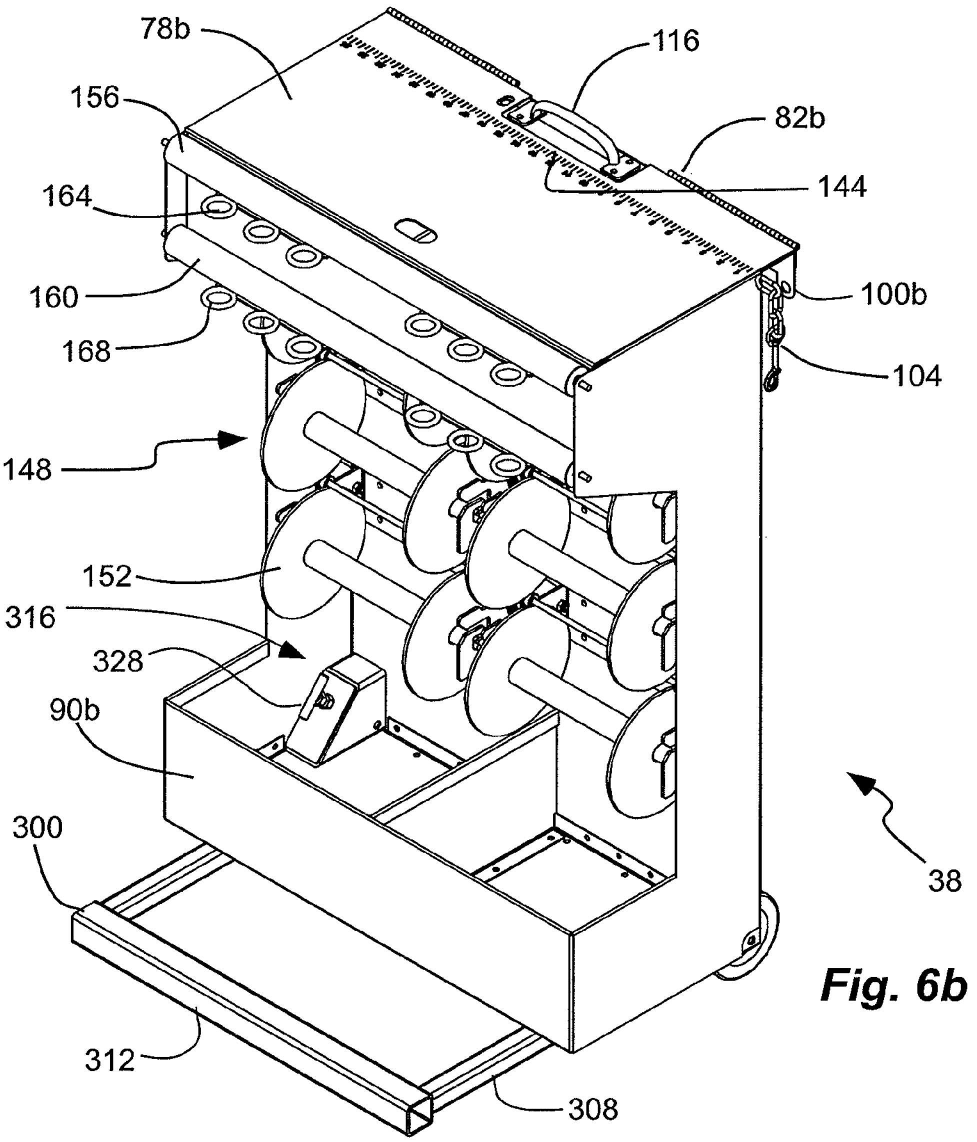
FIG. 6*b* is a perspective view of the wire dispenser toolbox of FIG. 6*a*, shown with the lid in a closed position.
Figure 7:
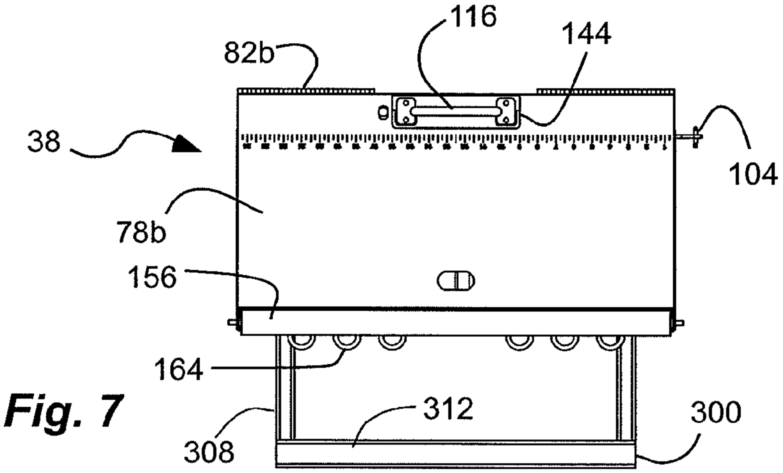
FIG. 7 is a top view of the wire dispenser toolbox of FIG. 6*a*, shown with the lid in the closed position.
Figure 8:
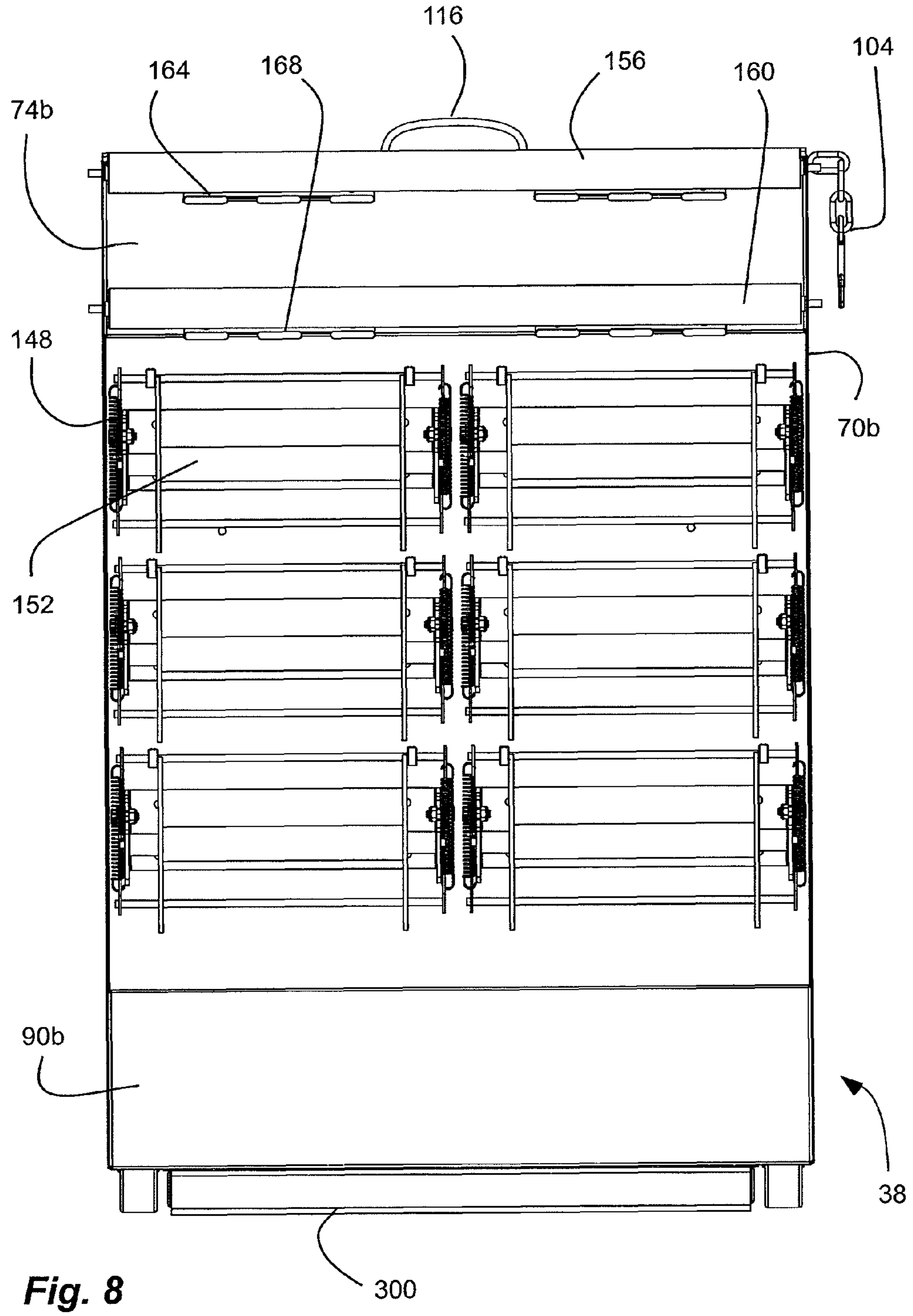
FIG. 8 is a front view of the wire dispenser toolbox of FIG. 6*a*, shown with the lid in the closed position.
Figures 9, 29:
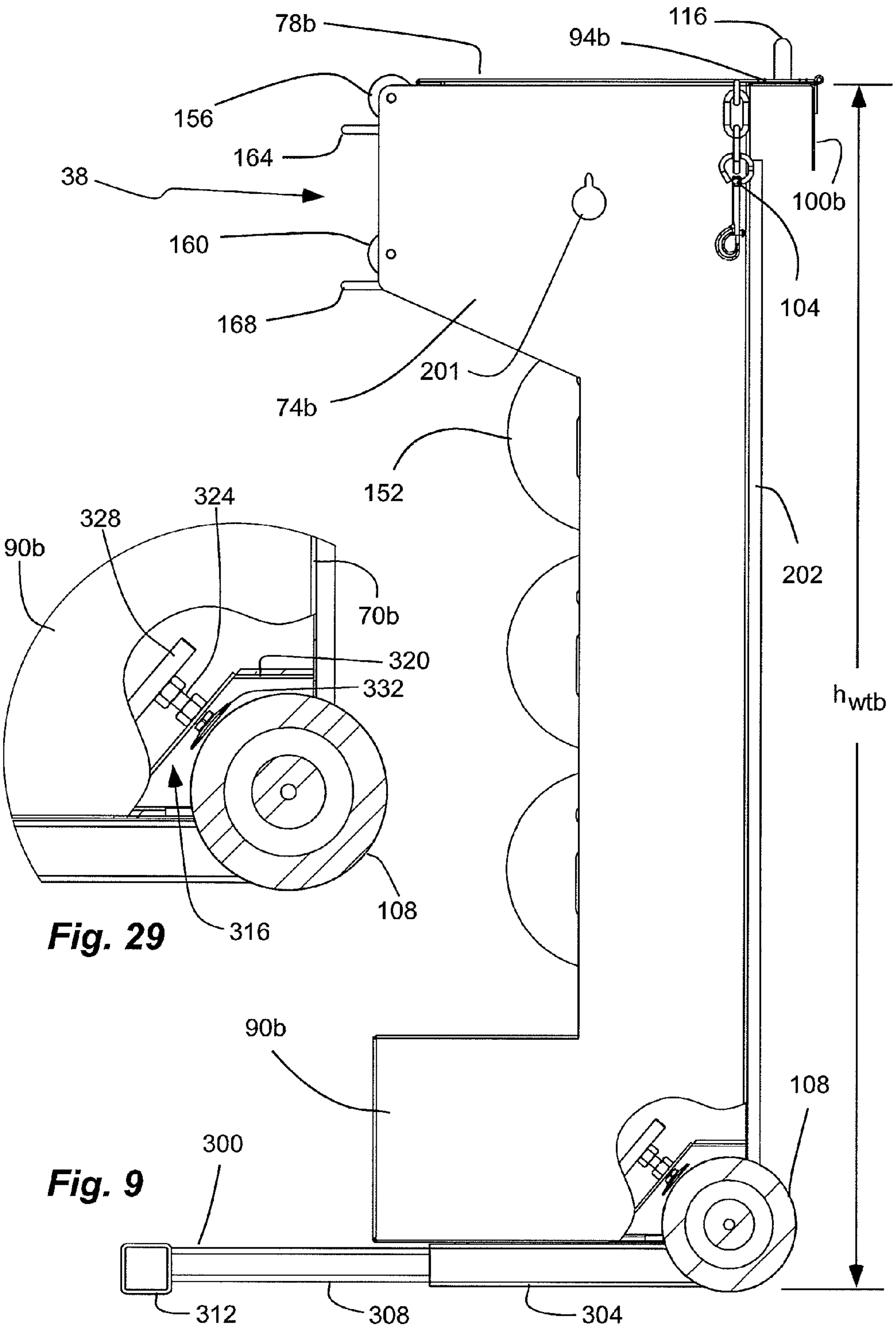
FIG. 9 is a side view of the wire dispenser toolbox of FIG. 6*a*, shown with the lid in the closed position.
FIG. 29 is a partial, broken away side view of a wheel of the toolbox of FIG. 6*a*.

The tool system 10 and/or the toolbox can also be configured as a wire dispensing toolbox 38 which is similar in many respects to the toolbox 34 described above, and which description is herein incorporated by reference. Referring to FIGS. 6*a*-9, the wire dispensing toolbox 38 can include a rail hanger 94*b* that can extend a length of the chest and box, and can form an elongated channel or hook with an inverted box J-shape with a back of the box, chest or toolbox forming a vertical flange, a horizontal flange 98*b* extending therefrom away from the back of the chest and over the upper rail, and a vertical lip 100*b* extending downwardly therefrom to retain the rail hanger on the upper rail and removably suspend the chest from the upper rail and above the floor of the platform. The wire dispensing toolbox 38 can also include a chest 70*b* with an upper box 74*b* and a lower or lowermost tray 90*b* disposed thereunder. The box 74*b* can include a lid 78*b* pivotal between a closed configuration in which the lid is substantially horizontal and spans the open top of the box (FIG. 6*b*), and an open configuration in which the lid is pivoted away from the box and is oriented substantially vertically behind the box 74*b*, the chest 70*b* and the toolbox 38 (FIG. 6*a*). Thus, the lid 78*b* is pivotally coupled by a hinge 82*b* to a top and a rear edge of the rail hanger 94*b*. The horizontal flange 98*b* of the rail hanger can be substantially flush or level with the top of the lid 78*b* in the closed position, as shown in FIGS. 6*b* and 9. Thus, in the open position, the lid 78*b* can hang vertically from the rail hanger 94*b* behind the box, chest or toolbox (FIG. 6*a*). Therefore, the lid 78*b* can be pivoted out of the way in the open position so it does not interfere with pulling wire, as described further below. A handle aperture 144 (FIGS. 6*b* and 7) can be formed in the lid 78*b* and the hinge 82*b* adjacent to and extending around the pull handle 116 in the closed position. In the closed position, the lid 78*b* extends over the box 74*b* and the rail hanger 98*b*, with the handle aperture 144 accommodating the pull handle 116. The wire dispensing toolbox 38 can be suspended from the upper rail of the guard rail on an outside of the platform or guard rail, with the lid folded down on the inside of the platform or guard rail, opposite the toolbox, to avoid interference with workers, as shown in FIG. 1*a*. The wire dispensing toolbox 38 and/or chest 70*b* can have a height $h_{wtb}$ (FIG. 9), from an inside top of the rail hanger 94*b* to a bottom of the pair of wheels 108 (and the foot 300), extending a majority of the height $h_{gr}$ of the guard rail 22 or upper rail 26. In one aspect, the toolbox 38 and/or chest 70*b* can have a height $h_{wtb}$ of approximately 36 inches.

The wire dispensing toolbox 38 can include one or more wire dispensers 148 disposed under the upper toolbox 74*b*, and between the upper box 74*b* and the lower or lowermost tray 90*b*. In one aspect, the toolbox 38 can have six wire dispensers 148, in two columns and three rows. The wire dispensers 148 hold a spool of wire 152 (empty spools shown without wire). The wire dispensers 148 can rotatably and resistively hold a spool of wire 152. The box 74*b* and/or chest 70*b* can include one or more rollers, such as upper and lower rollers 156 and 160 disposed on a top and a bottom of the front of the box. The rollers can span the width of the toolbox and chest. In addition, the box 74*b* and/or chest 70*b* can include one or more wire guide loops, such as upper and lower wire guide loops 164 and 168 or upper and lower sets of loops (in one aspect including six upper and six lower loops) also disposed on the top and bottom of the front of the box, below the upper and lower rollers, respectively. Thus, wire can extend from the spools 152 on the wire dispensers 148, each through a separate set of upper and lower wire loops 164 and 168, and over the upper and lower rollers 156 and 160, to a position over the toolbox 38 where a worker can access and pull the wires. The rollers can extend horizontally and/or forwardly into a vertical path of the wires through the holes of the guides so that the wires bear against the rollers while being pulled. The rollers roll or rotate to reduce friction.

Figure 10:
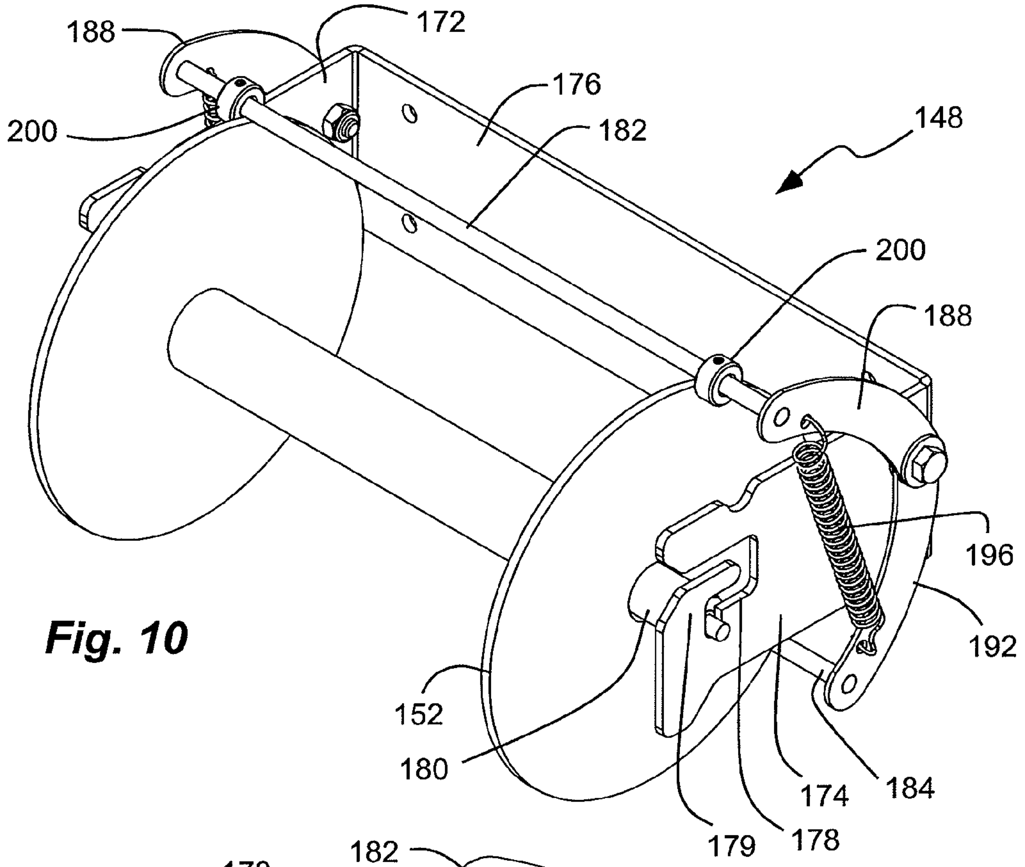
FIG. 10 is a perspective view of a perspective view of a wire dispenser of the wire dispenser toolbox of FIG. 6*a* (and of the wire base of FIG. 18), shown with a wire spool with the wire removed.
Figure 11A:
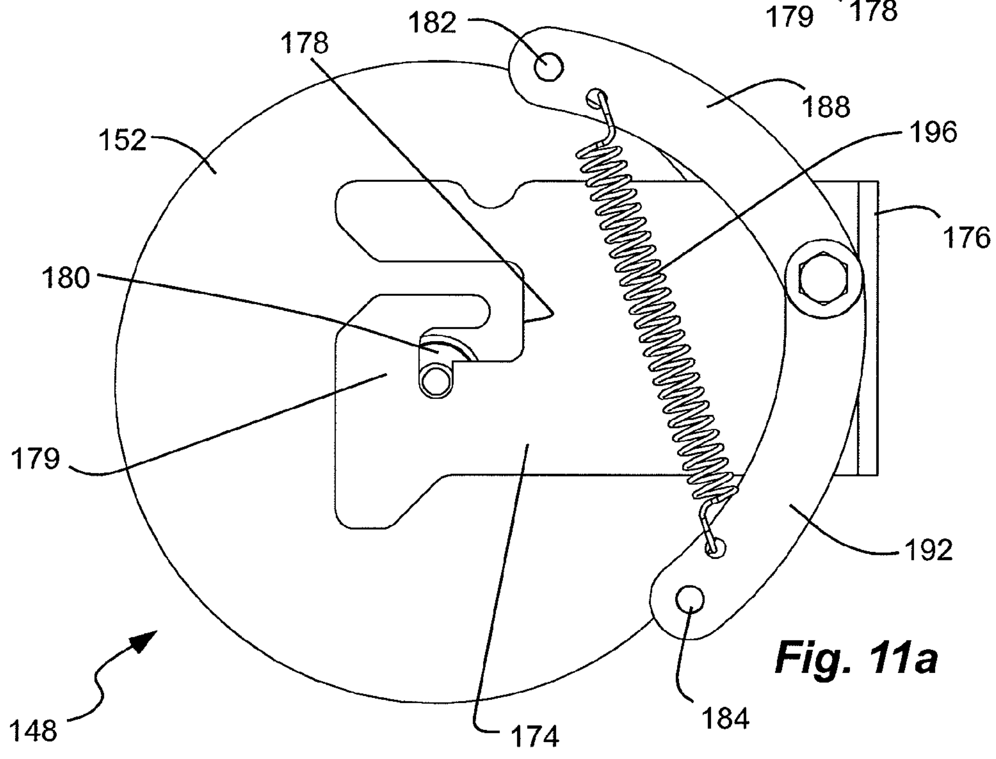
FIG. 11*a* is a side view of the wire dispenser of FIG. 10, shown with a wire spool with the wire removed.
Figure 11B:
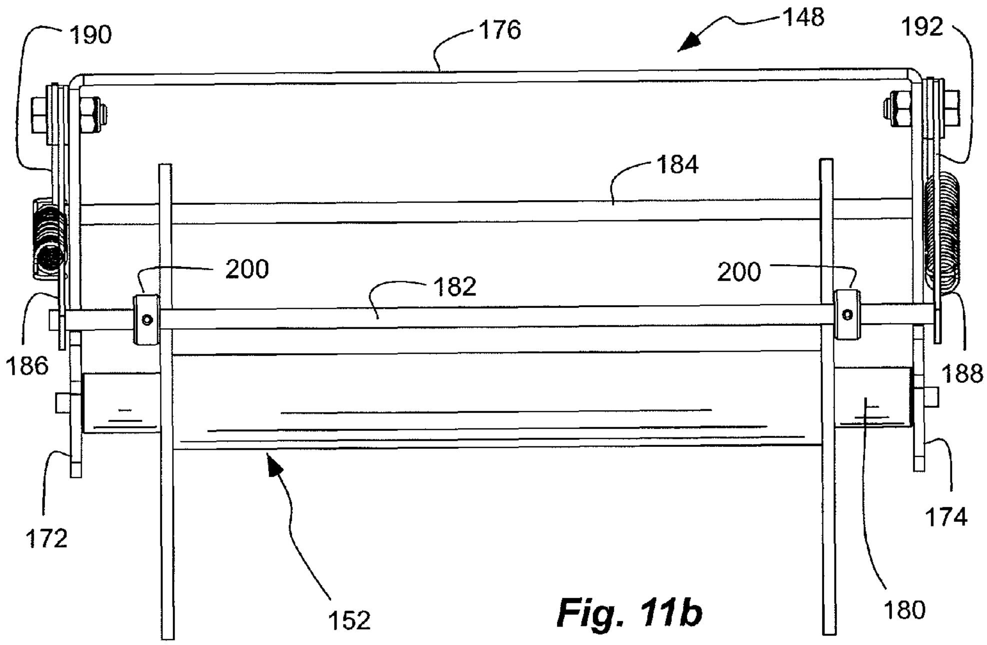
FIG. 11*b* is a top view of the wire dispenser of FIG. 10, shown with a wire spool with the wire removed.
Figure 11C:
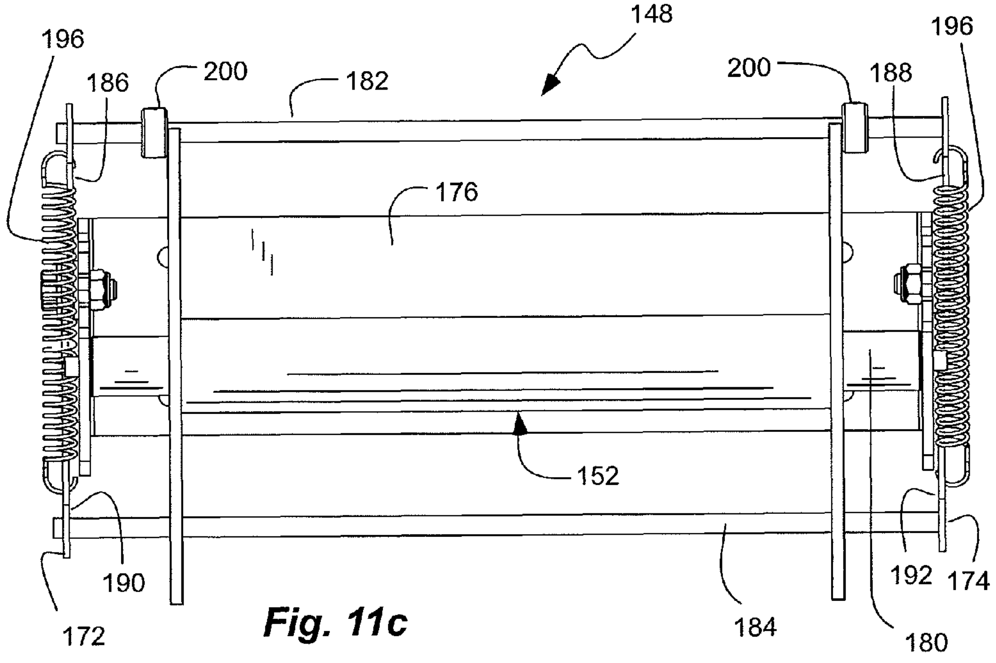
FIG. 11*c* is a front view of the wire dispenser of FIG. 10, shown with a wire spool with the wire removed.
Figure 15:
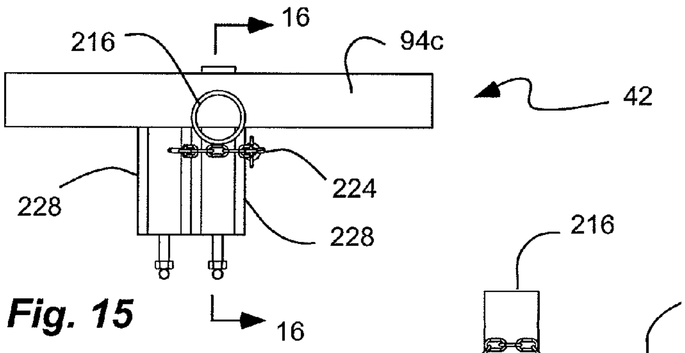
FIG. 15 is a top view of the component base of FIG. 12.
Figure 14:
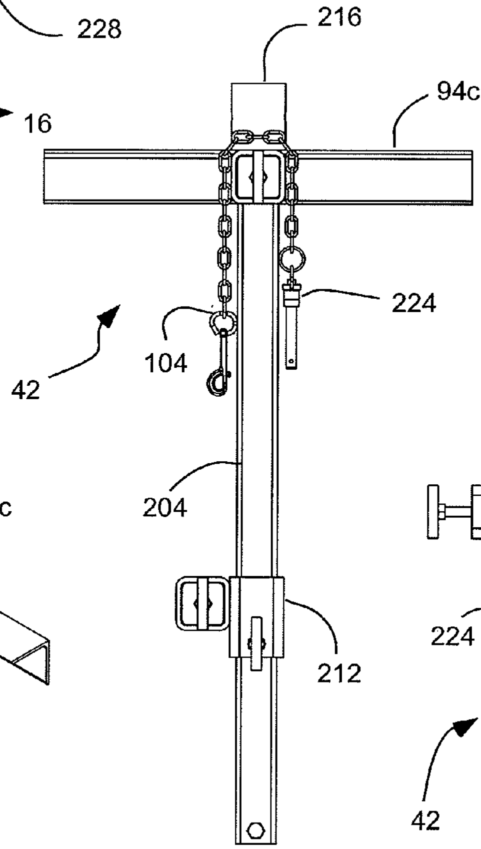
FIG. 14 is a front view of the component base of FIG. 12.
Figure 12:
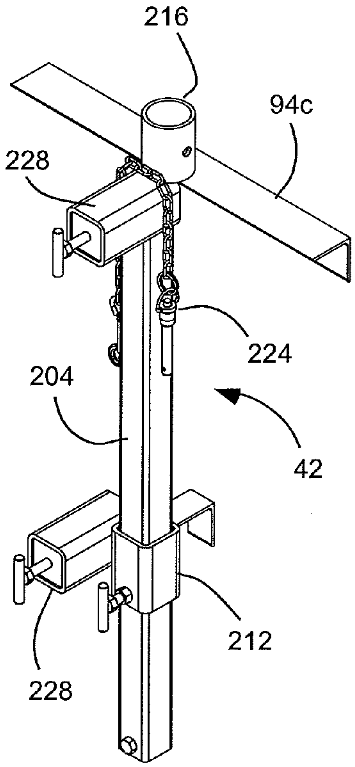
FIG. 12 is a perspective view of a component base of the tool system of FIGS. 1*a* and 1*b;*
Figure 13:
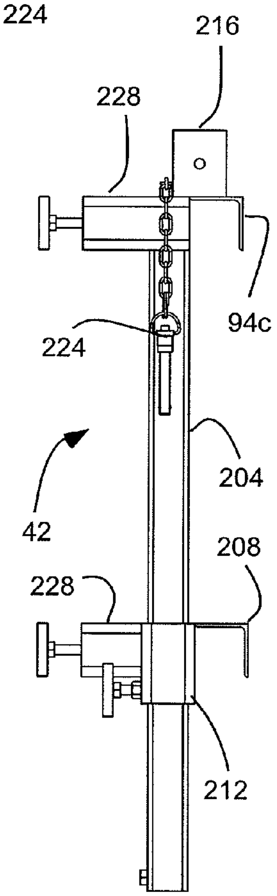
FIG. 13 is a side view of the component base of FIG. 12.
Figure 16:
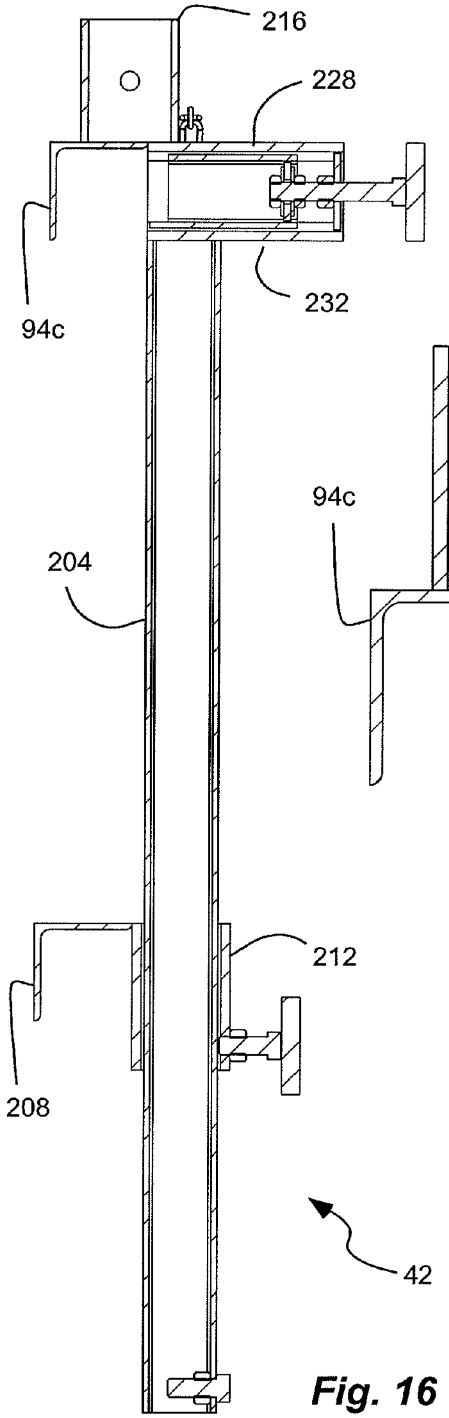
FIG. 16 is a cross-sectional side view of the component base of FIG. 12 taken along line 16 of FIG. 15.
Figure 17:
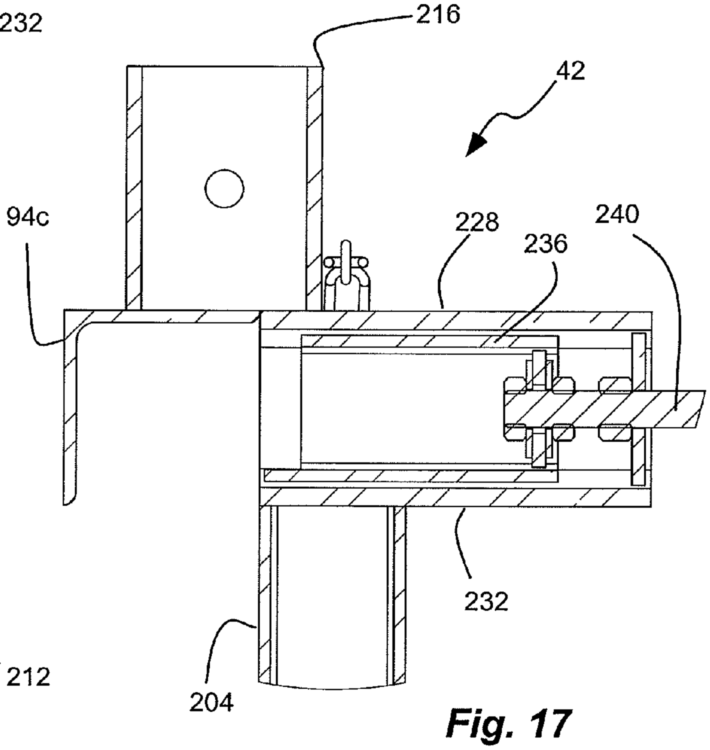
FIG. 17 is a partial detailed cross-sectional side view of the component base of FIG. 12.

Referring to FIGS. 10-11*c*, the wire dispensers 148 can each have separate and independent wire dispenser assemblies. Each wire dispenser 148 can have a pair of lateral, spaced-apart flanges 172 and 174 oriented vertically and extending horizontally and forwardly from the back wall of the chest. The flanges can be coupled together by a base 176, and together form a U-shaped member with the base affixed to the toolbox, or back wall thereof, and with the flanges extending horizontally outwardly therefrom. A serpentine slot 178 can be formed in the flanges extending from an open front end in the flanges, substantially horizontally rearwardly a greater distance, substantially vertically downwardly a greater distance, substantially horizontally forwardly a lesser distance, and substantially vertically downwardly a lesser distance, in a substantial question mark shape, or ?-shape. The serpentine slot 178 can form a cavity or indentation with an upward and rearward extending lip 179 extending substantially over and into the cavity or indentation. A roller bearing 180 can have opposite ends insertable into the slots 178 of the flanges 172 and 174, and can extend between the flanges, to hold the spool 152 thereon. Thus, the roller bearing can be inserted into the spool, and then inserted into the slots of the flanges. A pair of rods, namely upper and lower rods 182 and 184, can be movably disposed above and below the flanges, respectively, to bear against the spool. The upper and lower rods can be carried by a pair of arms on each side of the wire dispenser, namely a pair of upper arms 186 and 188 and a pair of lower arms 190 (FIG. 18) and 192. An upper and a lower arm 186 and 190, and/or 188 and 192, can form a set or pair of arms on each side of the spool, flanges, or wire dispenser. One end of the arms can be coupled to the rods, while the other end of the arms can be pivotally coupled to the wire dispenser, such as the flanges. The upper rod 182 moves as the upper arms 186 and 188 pivot, and the lower rod 184 moves as the lower arms 190 and 192 pivot. A coil spring 196 can extend between the upper and lower arms on each side. The coil spring can be sized to be in tension and pull the arms, and thus the rods, together. The spring is one example of a means for biasing the upper and lower rods towards the roller bearing, and against the spool of wire. Biasing the rods against the spool provides resistance to turning of the spool on the roller bearing, thus resisting inadvertent unspooling of the wire, and requiring a positive pulling force on the wire to remove wire from the spool.

The wire dispensers 148 can accommodate spools 152 of different sizes, or diameters, including for example, diameters between 2½ and 6½ inches. The movable rods 182 and 192 can move in and out based on the diameter of the spool, while still bearing against the spool. In addition, the wire dispensers can accommodate spools of different lengths or widths (taken along the longitudinal or rotational axis of the spool). A pair of slidable and fixable stops 200 can be slidably disposed on one or more of the rods, e.g. 182, and spaced apart the length or width of the spool, with the spool therebetween, and fixed to the rods, such as with a set screw, to hold the spool longitudinally on the roller bearing 180. The upper and lower rods 182 and 184 bear against the spool 152, namely the outer, circular flanges of the spool, due to the spring 196. The arms can be sized to position the rods 182 and 184 on an inside or inner side of the spool, i.e. towards the toolbox. The rods being disposed on one side of the spool under bias force from the spring requires a force to insert the spool in and between the rods when inserting the spool into the wire dispenser, and thus inserting the ends of the roller bearing into the slots. In addition, the rods under bias force from the springs push the spool away from the wire dispenser, and thus the ends of the roller bearing against the lip 179. Thus, gravity and the spring force tend to retain the ends of the roller bearing in the slot, and thus the spool in the wire dispenser. Furthermore, the rods under bias force from the springs will also push or eject the spool from the wire dispenser during removal.

In use, a worker can insert the roller bearing 180 into a spool 152. The spool 152 can then be pushed against the rods 182 and 184, and against the force of the spring 196 to separate the rods as the ends of the roller bearing are inserted into the slots 178. The spool 152 can be pushed back, against and into the wire dispenser 148 with the ends of the roller bearing along the first substantially horizontal portion of the slot to a first substantially vertical portion of the slot, where gravity will tend to draw the spool, and ends of the roller bearing downwardly. The spring force against the rods will then tend to push the spool forwardly, with the ends of the roller bearing in a second substantially horizontal portion of the slot to a second substantially vertical portion of the slot, where again gravity will tend to draw the spool, and the ends of the roller bearing downwardly. The spring force against the rods will then tend to push the spool forwardly, with the ends of the roller bearing against the lip 179, thus retaining the spool and providing resistance to rotation. A free end of the wire on the spool can then be threaded through a corresponding pair of the wire guide loops 164 and 166.

A method for providing the toolbox 34 and wire dispensing toolbox 38 on the platform or floor 18 of the aerial work platform 14 includes tilting the chest 70 or 70*b* rearwardly onto the pair of wheels 108. The chest is then pulled by the handle 116 towards the aerial work platform 14. The chest is then hung from the guard rail 22 by hanging the rail hanger 94 or 94*b* of the chest on the upper rail 26 of the guard rail. The chest, or toolbox, can be hung on an inside or an outside of the guard rail. The chest, or toolbox, can be lifted manually, or with a powered lift, onto the platform, or directly onto the handrail. Similarly, the chest, or toolbox, can be transported away from the AWP by removing the chest or toolbox from the guard rail, tilting the chest onto the wheels, and pulling the chest by the handle away from the platform. Apertures 201 (FIGS. 4 and 9) can be formed in the rail hanger, or the sides of the chest, to accommodate hooks or chains to be secured to a lift to assist in lifting the chest or toolbox. In addition, the toolbox 34 or wire dispensing toolbox 38, or chest 70*a* or 70*b* thereof, can have one or more glides 202 (FIGS. 4 and 9) disposed on a back of the chest and extending along substantially the entire height of the back to provide a bumper and/or lower friction strip to facilitate transport of the toolbox as it is pulled over objects such as the platform or a truck bed. The glide can bear against the lower rail of the guard rail when the toolbox is suspended.

As mentioned above, the tool system 10 can also include other tools and accessories that can be used in conjunction with the toolbox 34 and/or wire dispensing toolbox 38. Such other tools and accessories can similarly be mounted or carried by the guard rail 22 of the platform. The tools and accessories can utilize one or more component bases 42 separate from the toolbox 34 and/or 38. The component bases 42 can hang from, or be suspended by, the upper rail 26 of the guard rail, and can also engage the lower rail 30. Referring to FIGS. 12-17, the component base 42 can include an upper rail hanger 94*c* hooked on and hanging from the upper rail 26 of the guard rail 22. Similar to that described above, the upper rail hanger 94*c* can form an elongated channel or hook with an inverted box J-shape with a vertical support or column of the component base forming a vertical flange, a horizontal flange extending therefrom away from the vertical support and over the upper rail, and a vertical lip extending downwardly therefrom to retain the upper rail hanger on the upper rail and removably suspend the component base from the upper rail and above the floor of the platform. The vertical support, the flange and the lip can form the channel or hook. The upper rail hanger, or channel or hook, can have a downward opening so that the upper rail hanger removably hooks the component base to the upper rail of the guard rail, and is retained thereon by gravity. A safety chain 104 with a clip attached thereto can have one end of the chain coupled to the component base, vertical support or the upper rail hanger and extendable around the upper rail with the clip attached to the end of the chain, the vertical support or the upper rail hanger to further secure the component base to the rail guard. A vertical support 204 or column is attached to and extends downwardly from the rail hanger 94*c*, and past the lower rail 30 of the guard rail. A lower rail hanger 208 is slidably and fixably disposed on the vertical support 204, and engages the lower rail 30 of the guard rail. Thus, the upper and lower rail hangers 94*c* and 208 can be vertically aligned with one another, and disposed over and under one another. The lower rail hanger 208 can be attached to a collar 212 slidably disposed on the vertical support 204, and affixed in a desired position by a set screw. Thus, the component base can fit on guard rails with different spacing between upper and lower guard rails. In addition, the collar 212 can form a portion of an inverted channel of the lower rail hanger 208. The lower rail hanger resists the component base from pivoting about the upper rail. The upper rail hanger can be substantially wider than the vertical support to resist the component base from tipping in a plane of the rails.

A receiver mount 216 can be coupled above the upper rail hanger 94*c* and the vertical support 204. For example, the receiver mount can be attached to the top of the upper rail hanger 94*c*, and can form the uppermost portion of the component base 42. The tools and/or accessories can be mountable accessories, some of which have been identified above, with a coupler 220 (FIGS. 18-23) being removably coupled to the receiver mount 216. Thus, the coupler and the receiver mount can nest or mate with one another. For example, the receiver mount 216 can be a cylinder or tube; while the coupler can be a smaller rod or tube receivable in the cylinder or tube of the receiver mount. Lateral apertures in the tubes can be aligned to receiver a locking pin 224, which can be secured to the component base by a chain.

The component base 42, and the upper and lower rail hangers 94*c* and 208 thereof, can further include one or more clamps 228 associated with the upper and/or lower rail hangers to grip the upper rail and/or the lower rail. The clamp 228 can be opposite the lip of the rail hanger, and can vary a gap between the clamp and the lip the hold the rail therebetween. The clamp 228 can include an outer tube 232 coupled to a side of the upper or lower rail hanger with an open end facing into the upper or lower rail hanger. An inner tube 236 can be movably or slidably disposed in the outer tube 232, and can be extendable and retractable from the open end of the outer tube, into and out of the rail hanger, or channel thereof. A screw 240 can be coupled to the inner tube 236 and threadedly engaged with a closed end of the outer tube 232, opposite the open end, such that turning the screw advances and retracts the inner tube in the outer tube.

Figure 18:
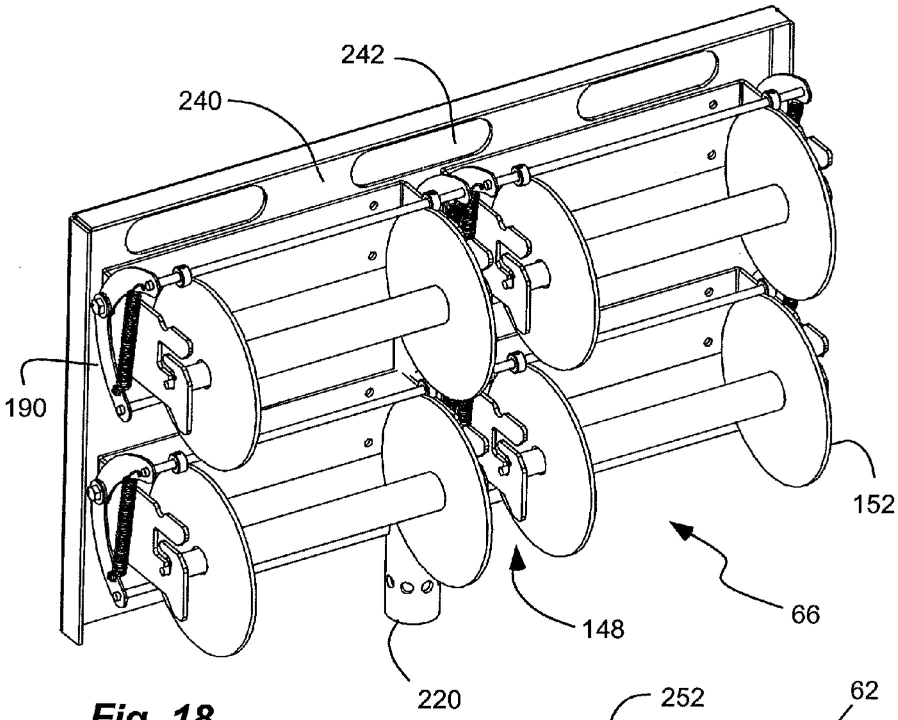
FIG. 18 is a perspective view of a wire base of the tool system of FIGS. 1*a* and 1*b;*

Referring to FIG. 18, one of the mountable accessories can include a wire base 66 for holding one or more spools of wire 152 in one or more wire dispensers 148. The wire base 66 can have a vertical plate 240 sized to hold the one or more wire dispensers 148. In one aspect, the wire base 66 and the plate 240 can be sized to hold four wire dispensers in two columns and two rows, or a two-by-two matrix. One or more apertures 244 can be formed in the top of the plate 240 to receive wires from the spools, and/or to form handles to facilitate lifting and carrying of the wire base 66. In addition, the wire base 66 can have a coupler 220 attached to a bottom of the plate 240. As described above, the coupler 220 of the wire base 66 can be received on and/or in the receiver mount 216 of the component base 42. The coupler 220 can have a plurality of through holes extending horizontally through the coupler and arrayed in multiple different directions to be selectively alignable with the lateral aperture in the receiver mount, to selectively orient the wire base with respect to the guard rail and platform. The locking pin 224 of the component base can be inserted through the lateral aperture of the receiver mount and the selected through hole of the coupler to lock the wire base to the component base, and thus the guard rail and platform, and to maintain the selected orientation of the wire base. The wire base 66 allows a worker to provide one or more wire dispensers 148 to the platform 24. The wire base 66 can be used in conjunction with the toolbox 34 and/or wire dispensing toolbox 38, and/or other mountable accessories.

Figure 19:
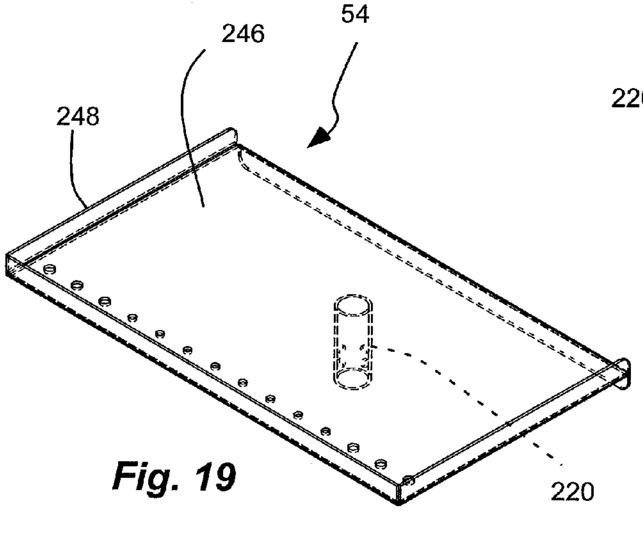
FIG. 19 is a perspective view of a work tray of the tool system of FIGS. 1*a* and 1*b;*

Referring to FIG. 19, one of the mountable accessories can include a work top 54. The work top 54 can have a horizontal plate 246 with a perimeter lip 248 extending around all or a portion of a perimeter of the plate. In one aspect, three contiguous sides of the plate can include an upward extending lip, while a fourth side has a downwardly extending lip. The upward extending lips can maintain objects, such as tools and/or work materials, on the plate and the work top, while the downward extending lip can facilitate access to such items. In addition, the work top 54 can have a coupler 220 attached to a bottom of the plate 246, such as in the center, as shown. Alternatively, the coupler can be attached closer to, or at, a perimeter of the plate. As described above, the coupler

220 of the work top 54 can be received on and/or in the receiver mount 216 of the component base 42. The coupler 220 can have a plurality of through holes extending horizontally through the coupler and arrayed in multiple different directions to be selectively alignable with the lateral aperture in the receiver mount to selectively orient the work top with respect to the guard rail and platform. The locking pin 224 of the component base can be inserted through the lateral aperture of the receiver mount and the selected through hole of the coupler to lock the work top to the component base, and thus the guard rail and platform, and to maintain the selected orientation of the work top. The work top 54 and the component base 42 allow a worker to provide a horizontal, elevated work surface to the platform 14, and can be used in conjunction with the toolbox 34 and/or wire dispensing toolbox 38, and/or other mountable accessories.

Figure 20:
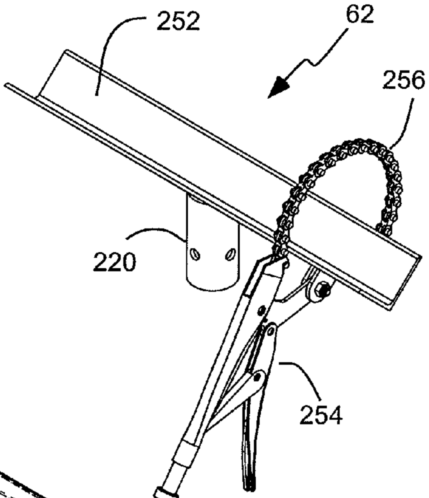
FIG. 20 is a perspective view of a chain clamp of the tool system of FIGS. 1*a* and 1*b;*
Figure 22:
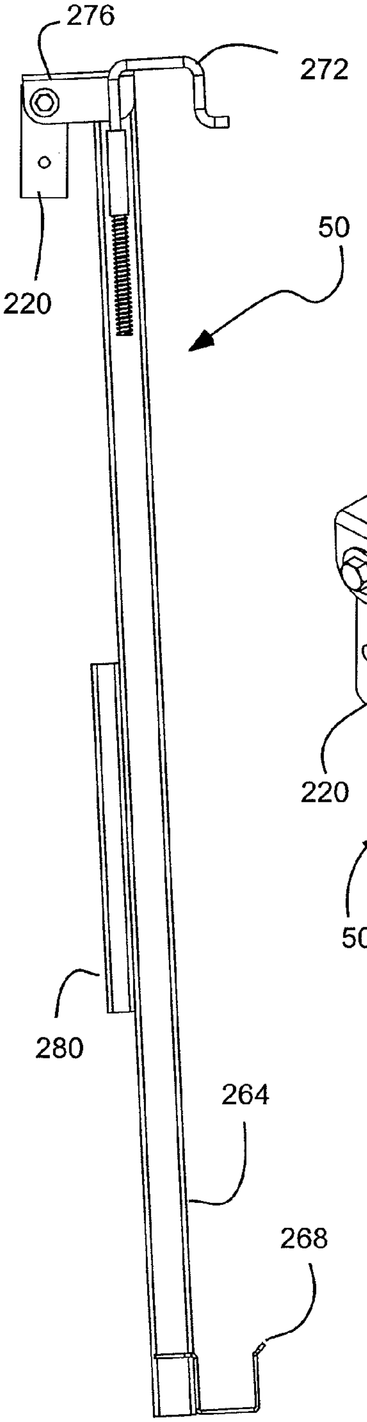
FIG. 22 is a side view of the panel hanger of FIG. 21.
Figure 23:
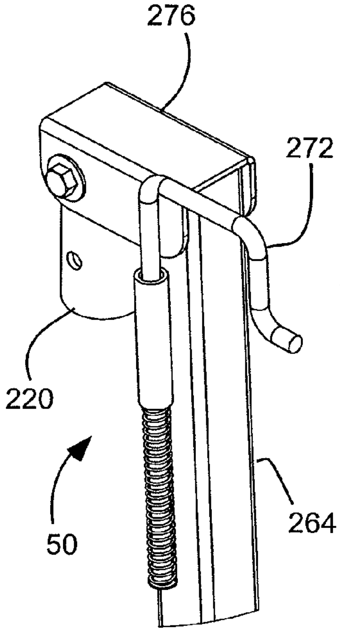
FIG. 23 is a partial detailed perspective view of the panel hanger of FIG. 21.
Figure 21:
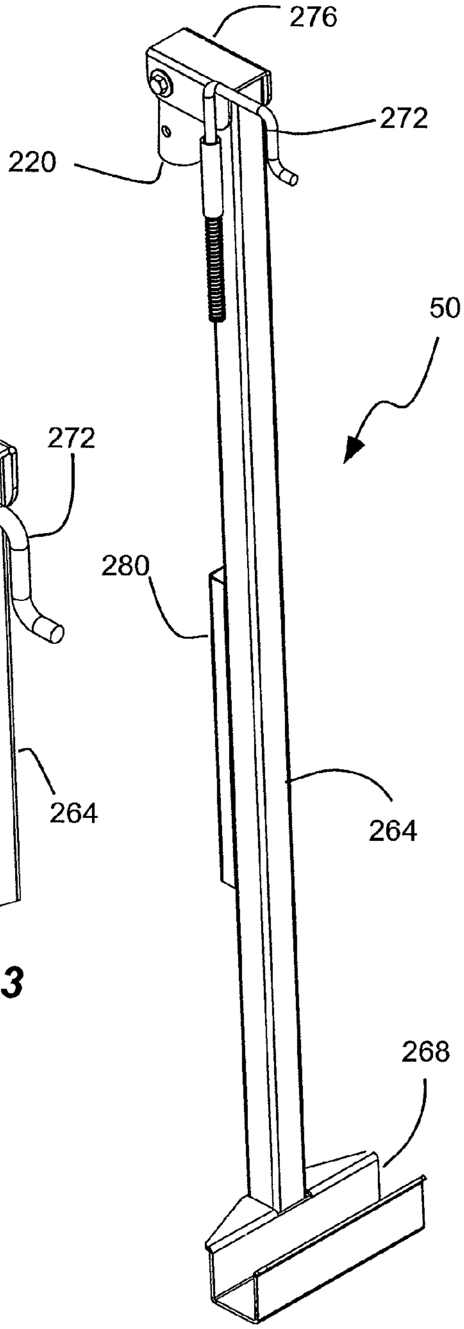
FIG. 21 is a perspective view of a panel hanger of the tool system of FIGS. 1*a* and 1*b;*
Figure 24:
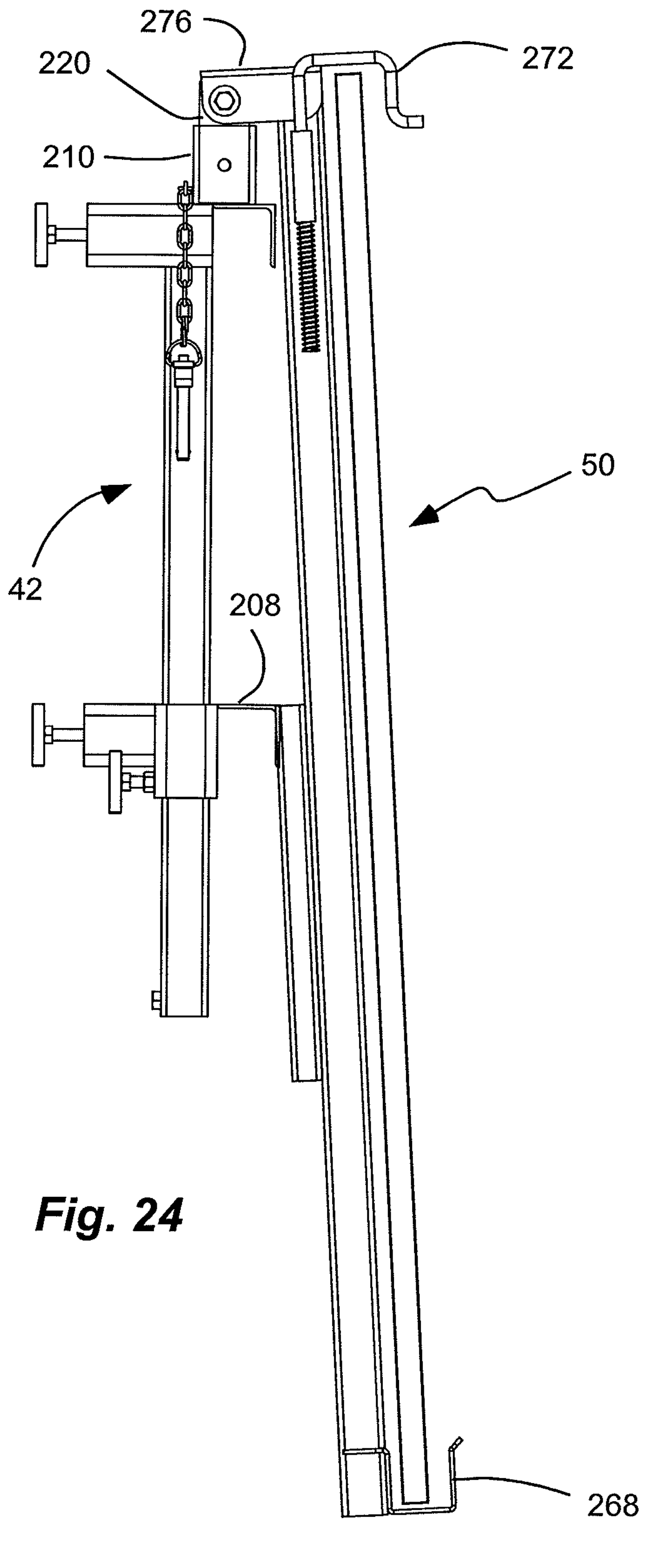
FIG. 24 is a side view of the panel hanger of FIG. 21, shown disposed on component base of FIG. 12.
Figure 25:
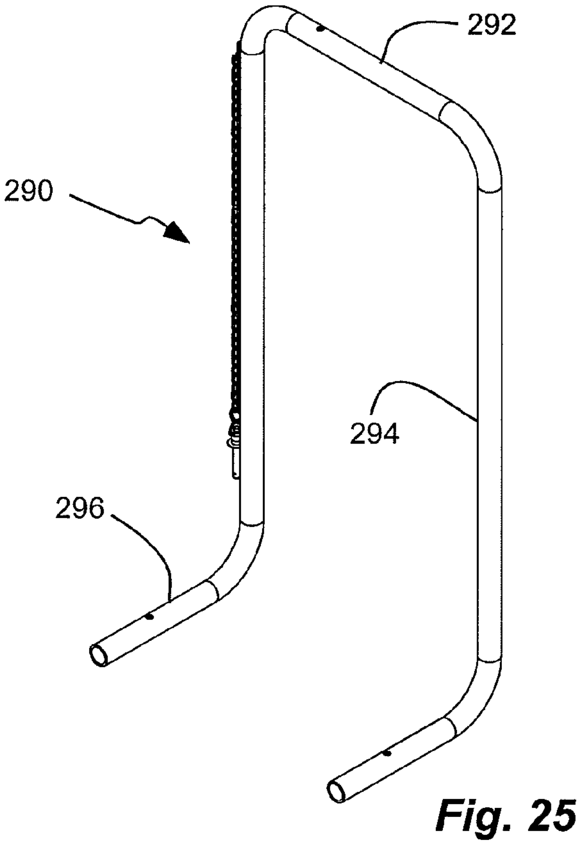
FIG. 25 is a perspective view of a stand of the tool system of FIGS. 1*a* and 1*b;*
Figure 28:
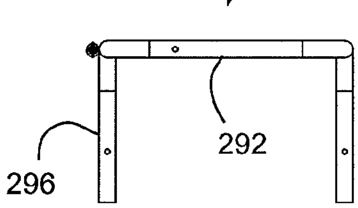
FIG. 28 is a top view of the stand of FIG. 25.
Figure 27:
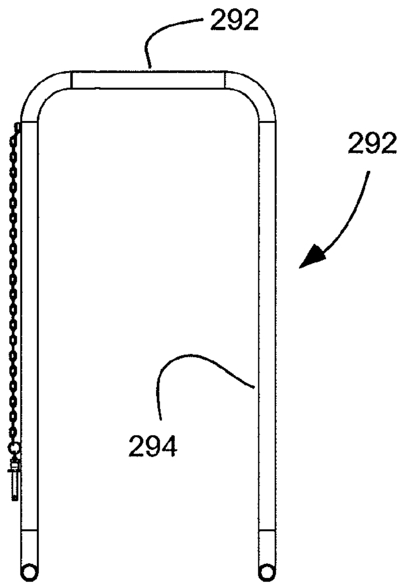
FIG. 27 is a front view of the stand of FIG. 25.
Figure 26:
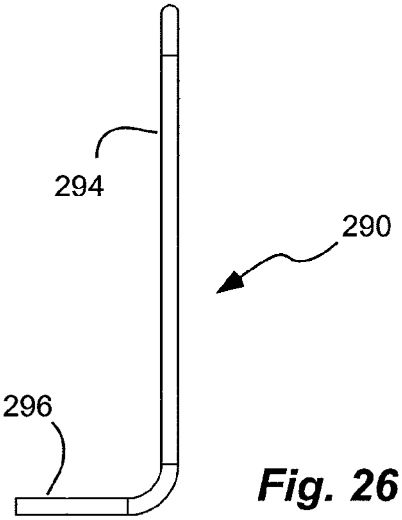
FIG. 26 is a side view of the stand of FIG. 25.

Referring to FIG. 20, one of the mountable accessories can include a chain clamp 62 for receiving and securing pipe or tubing to the guard rail and the platform. The chain clamp 62 can include an elongated channel, such as a V-shaped channel 252 to receive pipe or tubing of various different diameters. A modified vise grip 254 can be mounted to the channel with a chain 256 attached to the modified vise grip and the channel, and extending around the channel or top thereof in a loop. Thus, a pipe or tubing can be inserted through the loop of the chain and disposed in the channel, with the vise grip tightened to secure the pipe or tubing. In addition, the chain claim 62 can have a coupler 220 attached to a bottom of the channel 252. As described above, the coupler 220 of the chain claim 62 can be received on and/or in the receiver mount 216 of the component base 42. The coupler 220 can have a plurality of through holes extending horizontally through the coupler and arrayed in multiple different directions to be selectively alignable with the lateral aperture in the receiver mount to selectively orient the chain clamp with respect to the guard rail and platform. The locking pin 224 of the component base can be inserted through the lateral aperture of the receiver mount and the selected through hole of the coupler to lock the chain clamp to the component base, and thus the guard rail and platform, and to maintain the selected orientation of the chain clamp. The chain clamp 62 and the component base 42 allow a worker to provide a elevated chain clamp to the platform 14, and can be used in conjunction with the toolbox 34 and/or wire dispensing toolbox 38, and/or other mountable accessories.

Referring to FIG. 1*a*, the mountable accessory can include a pair of racks 46*a* or 46*b* mounted on a pair of component bases 42 for receiving a plurality of pipes, tubing, etc. Each rack 46*a* or 46*b* can have a yoke 260*a* or 260*b* with a substantial U-shape having a bottom member that can be substantially horizontal and a pair of upward extending vertical or inclined arms. In addition, each rack 46*a* or 46*b* can have a coupler 220 attached to a bottom of the yoke 260*a* or 260*b*, with the yoke extending from the coupler. The coupler can be coupled to a side or perimeter of the bottom of the yoke adjacent one of the arms, as shown. Thus, the yoke or rack, or a majority thereof, can extend off the outer side of the guard rail or platform, or mostly outside of the platform, to allow more room for workers. As described above, the coupler 220 of the rack can be received on and/or in the receiver mount 216 of the component base 42. The locking pin 224 of the component base can be inserted through the lateral aperture of the receiver mount and the through hole of the coupler to lock the rack to the component base, and thus the guard rail and platform. A pair of component bases with a pair of racks can be mounted to the guard rail in a spaced-apart relationship to hold elongated pipe or tubing. The racks 46*a* and 46*b*, or yokes 260*a* and 260*b* thereof, can have different sizes to accommodate different numbers and/or sizes of pipe or tubing. The racks and the component base 42 allow a worker to provide pipe or tubing to an elevated workplace with the platform 14, and can be used in conjunction with the toolbox 34 and/or wire dispensing toolbox 38, and/or other mountable accessories.

Referring to FIGS. 1*b* and 21-24, the mountable accessory can include a pair of panel hangers 50 (FIG. 1*b*) mounted on a pair of component bases 42 for receiving and securing a panel or drywall, etc. Each panel hanger 50 can have a hanger bar 264 with a channel 268 near the bottom of the hanger bar, and a top retainer 272 at a top of the hanger bar. The hanger bar 264 can hang from the coupler 220. In addition, the hanger bar can be pivotally coupled to the coupler. The panel hanger can have an extender 276 pivotally coupled to the coupler 220, extending laterally or horizontally, and affixed to the hanger bar 264 so that the hanger bar hangs from the extender 276 and is spaced-apart from the coupler, and thus the guard rail. The panel hanger can be disposed on the outside of the guard rail and the platform. The hanger bar can have a height corresponding to a width of the panel or drywall. Thus, the hanger bar can have a height of approximately four feet. The coupler can be sized so that the hanger bar extends from near a bottom of the platform, to above the upper guard rail. The top retainer 272 can have a hook shape with a generally inverted block J-shape. The top retainer 272 can be movably and pivotally coupled to the panel hanger or hanger bar. An elongated column of the top retainer 272 can extend through a collar affixed to the hanger bar. A distal end of the column can extend past the collar with coil compression spring disposed between the distal end of the column and the collar to allow the top retainer to move away from the collar in an upward direction, while biasing or drawing the top retainer towards the collar in a downward direction. The column can also pivot in the collar. A proximal end of the column can form a hook that can be pulled upwardly (and/or pivoted towards the collar), against the spring, to allow a panel or drywall to be placed into the channel 268 and against the hanger bar 264. The proximal end of the column or hook of the top retainer can be released (and/or pivoted away from the collar) with the spring drawing the hook of the top retainer over the panel or drywall. Thus, the panel or drywall is held in the channel by gravity, with the top retainer resting movement or tipping of the panel or drywall away from the hanger bar. The pivotal connection allows the hanger bar 264 to rest against the guard rail or lower rail thereof. A spacer and/or bumper 280 can be attached to the hanger bar and can abut to the guard rail or lower rail thereof (or the lower rail hanger 208 of the component base) to protect the guard rail and/or maintain the hanger bar at an angle or incline to resist tipping of the panels or drywall. As described above, the coupler 220 of the panel hanger can be received on and/or in the receiver mount 216 of the component base 42. The locking pin 224 of the component base can be inserted through the lateral aperture of the receiver mount and the through hole of the coupler to lock the panel hanger to the component base, and thus the guard rail and platform. A pair of component bases with a pair of panel hangers can be mounted to the guard rail in a spaced-apart relationship to hold elongated panels and/or drywall. The panel hangers 50 and the component base 42 allow a worker to provide panels or drywall to an elevated workplace with the platform 14, and can be used in conjunction with the toolbox 34 and/or wire dispensing toolbox 38, and/or other mountable accessories.

Referring again to FIG. 1*a*, one of the mountable accessories can include a tool base 58 for mounting a tool, such as a vice. The tool base 58 can include a horizontal plate 284 with a plurality of holes and/or slots formed therein, such as a plurality of radially extending slots arrayed circumferentially around the plate and emanating from a center thereof. A tool, such as a vise, can be mounted to the hole pattern of the plate. As described above, the coupler 220 of the tool base can be received on and/or in the receiver mount 216 of the component base 42, as shown in FIG. 1*a*. The locking pin 224 of the component base can be inserted through the lateral aperture of the receiver mount and the through hole of the coupler to lock the tool base to the component base, and thus the guard rail and platform. The tool base 58 and the component base 42 allow a worker to provide an elevated tool to the platform 14, and can be used in conjunction with the toolbox 34 and/or wire dispensing toolbox 38, and/or other mountable accessories.

The mountable accessories described above are examples of various different mountable accessories that can be carried by the component base on the guard rail of the platform. The various mountable accessories and toolbox(s) described above can be utilized in different configurations to suit the work project.

As mentioned above, the toolbox 34 and/or 38 can be removed from the guard rail of the platform and transported for convenience and/or security. The toolbox can be transported in a truck or van. As described above, the toolbox can include holes for hooks and/or chains to attach the toolbox to a lift (such as a truck lift, fork lift, etc.) to assist in raising and lowering the toolbox to and from the truck and van, and the platform of the AWP. Referring to FIGS. 25-28, the tool system can also include a stand 290 mountable in the truck or van to receive the toolbox. The stand 290 can include an upper rail 292 suspended by a pair of legs 294 with a pair of feet 296. The pair of legs can have a height to elevate the upper rail 292 to the same or similar height of the upper guard rail, as described above. The pair of feet 296 can be mounted or fixed to the bed of the truck or van. Thus, the toolbox can be hung on the upper rail 292 of the stand, as described above with respect to the guard rail. In addition, the stand can include a safety chain and pin coupled to the stand to extend around all or a portion of the toolbox to maintain the toolbox on the stand.

The toolbox 34 and/or wire dispensing toolbox 38 can also be utilized on a support surface, such as a floor, off of the platform of the AWP. The wire dispensing toolbox 38 can include structure to resist movement and/or tipping while wire is pulled from the wire dispensers. Referring again to FIGS. 6*a*-9, the toolbox 38 or chest 70*b* can include an extendable foot 300 that extends forwardly and horizontally. A pair of tubes 304 can be spaced-apart and attached to a bottom of the chest with open front ends. The foot 300 can include a pair of arms 308 slidably disposed in the pair of tubes, with a front bar 312 coupled to the pair of bars. The foot 300 or front bar 312 thereof can be slide forward and out from under the chest to resist tipping of the chest when wire is pulled therefrom and when the toolbox is disposed on a support surface. In addition, referring to FIG. 29, the toolbox 34 and/or wire dispensing toolbox 38 can include a wheel brake 316 to resist the toolbox from inadvertently and/or undesirably moving. As described above, the wheels 108 can be recessed into the chest 70*b* or lower tray 90*b* thereof. A pocket can be formed in the bottom and/or back of the chest, and can include a fender 320 disposed over the wheel. A threaded aperture can be formed in the fender to receive a threaded rod 324 that can be advanced and retraced by turning a knob 328 on one end of the rod to move a brake pad or plate 332 on the opposite end of the rod. Thus, by turning the knob, the rod is advanced and retracted to abut and remove the brake pad or plate with respect to the wheel.

The toolboxes described above can be formed from metal, such as sheet metal that is cut and bent or folded to form various aspects of the chest and components thereof; while various pieces can be welded, spot welded or bolted together. The component base and the various mountable accessories can be formed of metal, such as from tube stock, angle iron, and metal plates, that are welded together.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A toolbox device in combination with an aerial work platform having a floor and a guard rail with an upper rail, the toolbox device comprising:

a) a chest having an upper box with a pivotal lid having a lid top defining a top of the chest and at least one lower tray disposed under the upper box;

b) a rail hanger attached to the chest and located at a back and the top of the chest, the rail hanger removably hooking the chest to the upper rail of the guard rail and removably suspending the chest from the upper rail and above the floor of the platform;

c) a pull, handle attached to a top of the rail hanger;

d) a pair of wheels coupled to a bottom and the back of the chest; and e) the toolbox device having a height greater than 35 inches and less than 48 inches from an inside top of the rail hanger to a bottom of the pair of wheels with the chest extending a majority of a height of the guard rail with the pair of wheels suspended above the floor of the platform when the chest is suspended from the upper rail, f) at least one foldable shelf pivotally coupled to the top of the chest with a shelf top substantially flush or level with the top of the lid when the lid is closed and the shelf is open;

g) a brace extending from the shelf top and abutting a side of the chest or the box when the shelf is open; and h) the top of the rail hanger extending above the shelf and the brace thereof when the shelf is folded over the top of the lid.

2. The toolbox device in accordance with claim 1, wherein the chest has 1) a mobile configuration in which the chest is tilted rearwardly on the pair of wheels and pullable by the handle; and 2) a suspended configuration in which the chest is suspended from the upper rail of the guard rail by the rail hanger with the pair of wheels off of the floor of the platform.

3. The toolbox device in accordance with claim 1, further comprising:

at least one foot attached to a bottom of the chest near a front of the chest opposite the pair of wheels, with the at least one foot suspended off of the floor of the platform when the chest is suspended from the upper rail.

4. The toolbox device in accordance with claim 1, wherein the rail hanger extends upward above the top of the chest.

5. The toolbox device in accordance with claim 1, further comprising:

at least one wire dispenser disposed under the upper box configure to rotatably and resistively hold a spool of wire, the wire dispenser including:

a pair of laterally spaced-apart, vertically oriented flanges;

a slot formed in each of the pair of flanges;

a roller bearing with opposite ends disposed in the slots and carried by the pair of opposite flanges, the roller bearing capable of carrying the spool of wire;

upper and lower rods movably disposed above and below the flanges, respectively, configured to bear against the spool of wire;

a pair of upper arms disposed on opposite sides of the wire dispenser with one end pivotally coupled to the wire dispenser and another end coupled to the upper rod so that the upper rod moves and the pair of upper arms pivot;

a pair of lower arms disposed on opposite sides of the wire dispenser with one end pivotally coupled to the wire dispenser an another end coupled to the lower rod so that the lower rod moves as the pair of lower arms pivot; and means for biasing the upper and lower rods towards the roller bearing, and against the spool of wire.

6. The toolbox device in accordance with claim 5, further comprising:

at least one roller disposed on a front of the upper box; and at least one wire guide loop disposed on a front of the upper box.

7. The toolbox device in accordance with claim 1, further comprising a retractable wire rack including:

a rod slidable out of an aperture in the lateral side of the chest.

8. The toolbox device in accordance with claim 1, further comprising:

a safety chain with a clip attached thereto with one end of the chain coupled to the chest or the rail hanger and extendable around the upper rail with the clip attached to the end of the chain, the chest or the rail hanger.

9. The toolbox device in accordance with claim 1, wherein the lid of the box is pivotally coupled to a top and rear edge of the rail hanger, and is pivotal between: a closed position over the box, and an open position hanging vertically from the rail hanger behind the box.

10. The toolbox device in accordance with claim 1, further in combination with a separate component base device comprising:

a) an upper rail hanger hooked on and hanging from the upper rail of the guard rail;

b) a vertical support attached to and extending downwardly from the rail hanger past the lower rail of the guard rail;

c) a lower rail hanger slidably and fixably disposed on the vertical support and engaging the lower rail of the guard rail;

d) a receiver mount coupled above the upper rail hanger and the vertical support; and e) a mountable accessory having a coupler being removably coupled to the receiver mount.

11. A method for providing the toolbox device in accordance with claim 1 on the platform of the aerial work platform, the method comprising:

a) tilting the chest rearwardly onto the pair of wheels;

b) pulling the chest by the handle towards the aerial work platform; and c) hanging the chest from the guard rail by hanging the rail hanger of the chest on the upper rail of the guard rail.

12. A toolbox device in combination with an aerial work platform having a floor and a guard rail with an upper rail, the toolbox device comprising:

a) a chest having an upper box with a pivotal lid having a lid top defining a top of the chest and at least one lower tray disposed under the upper box;

b) a rail hanger attached to the chest and located at a back and the top of the chest, the rail hanger removably hooking the chest to the upper rail of the guard rail and removably suspending the chest from the upper rail and above the floor of the platform;

c) at least one wire dispenser disposed under the upper box configure to rotatably and resistively hold a spool of wire, the wire dispenser including:

d) a pair of laterally spaced-apart, vertically oriented flanges;

e) a slot formed in each of the pair of flanges;

f) a roller bearing with opposite ends disposed in the slots and carried by the pair of opposite flanges, the roller bearing capable of carrying the spool of wire;

g) upper and lower rods movably disposed above and below the flanges, respectively, configured to bear against the spool of wire;

h) a pair of upper arms disposed on opposite sides of the wire dispenser with one end pivotally coupled to the wire dispenser and another end coupled to the upper rod so that the upper rod moves and the pair of upper arms pivot;

i) a pair of lower arms disposed on opposite sides of the wire dispenser with one end pivotally coupled to the wire dispenser an another end coupled to the lower rod so that the lower rod moves as the pair of lower arms pivot; and j) means for biasing the upper and lower rods towards the roller bearing, and against the spool of wire.

13. The toolbox device in accordance with claim 12, further comprising:

a) a pull handle attached to a top of the rail hanger;

b) a pair of wheels coupled to a bottom and the back of the chest; and c) the toolbox device extending a majority of a height of the guard rail with the pair of wheels suspended above the floor of the platform when the chest is suspended from the upper rail.

14. The toolbox device in accordance with claim 12, further comprising:

at least one roller disposed on a front of the upper box; and at least one wire guide loop disposed on a front of the upper box.

15. The toolbox device in accordance with claim 12, wherein the lid of the box is pivotally coupled to a top and rear edge of the rail hanger, and is pivotal between: a closed position over the box, and an open position hanging vertically from the rail hanger behind the box.

16. The toolbox device in accordance with claim 12, further in combination with a separate component base device comprising:

a) an upper rail hanger hooked on and hanging from the upper rail of the guard rail;

b) a vertical support attached to and extending downwardly from the rail hanger past the lower rail of the guard rail;

c) a lower rail hanger slidably and fixably disposed on the vertical support and engaging the lower rail of the guard rail;

d) a receiver mount coupled above the upper rail hanger and the vertical support; and e) a mountable accessory having a coupler being removably coupled to the receiver mount.

17. A tool system configured for an aerial work platform having a floor and a guard rail with an upper rail and a lower rail, the tool system comprising:

a) at least one component base and at least one toolbox or wire dispenser toolbox suspended from the upper rail of the guard rail;

b) the toolbox or the wire dispenser toolbox comprising:

i) a chest having a box with a pivotal lid having a lid top defining a top of the chest;

ii) a rail hanger attached to the chest and located at a back and the top of the chest, the rail hanger removably hooking the chest to the upper rail of the guard rail and removably suspending the chest from the upper rail and off of the floor of the platform;

iii) a pull handle attached to a top of the rail hanger;

iv) a pair of wheels coupled to a bottom and the back of the chest; and v) the toolbox or wire dispenser having a height extending a majority of a height of the guard rail with the pair of wheels suspended above the floor of the platform when the chest is suspended from the upper rail;

c) the at least one component base comprising:

i) an upper rail hanger hooked on and hanging from the upper rail of the guard rail;

ii) a vertical support attached to and extending downwardly from the rail hanger past the lower rail of the guard rail;

iii) a lower rail hanger slidably and fixably disposed on the vertical support and engaging the lower rail of the guard rail;

iv) a receiver mount coupled above the upper rail hanger and the vertical support; and v) a mountable accessory having a coupler being removably coupled to the receiver mount.

18. The tool system in accordance with claim 17, further comprising:

at least one foldable shelf pivotally coupled to the top of the chest with a shelf top substantially flush or level with the top of the lid when the lid is closed and the shelf is open;

a brace extending from the shelf top and abutting a side of the chest or the box when the shelf is open; and the top of the rail hanger extending above the shelf and the brace thereof when the shelf is folded over the top of the lid.

19. The tool system in accordance with claim 17, wherein the lid of the box is pivotally coupled to a top and rear edge of the rail hanger, and is pivotal between: a closed position over the box, and an open position hanging vertically from the rail hanger behind the box.

20. The tool system in accordance with claim 17, further comprising:

at least one wire dispenser disposed under the upper box configure to rotatably and resistively hold a spool of wire, the wire dispenser including:

a pair of laterally spaced-apart, vertically oriented flanges;

a slot formed in each of the pair of flanges;

a roller bearing with opposite ends disposed in the slots and carried by the pair of opposite flanges, the roller bearing capable of carrying the spool of wire;

upper and lower rods movably disposed above and below the flanges, respectively, configured to bear against the spool of wire;

a pair of upper arms disposed on opposite sides of the wire dispenser with one end pivotally coupled to the wire dispenser and another end coupled to the upper rod so that the upper rod moves and the pair of upper arms pivot;

a pair of lower arms disposed on opposite sides of the wire dispenser with one end pivotally coupled to the wire dispenser an another end coupled to the lower rod so that the lower rod moves as the pair of lower arms pivot; and means for biasing the upper and lower rods towards the roller bearing, and against the spool of wire.

21. A toolbox device in combination with an aerial work platform having a floor and a guard rail with an upper rail, the toolbox device comprising:

a) a chest having an upper box with a pivotal lid having a lid top defining a top of the chest and at least one lower tray disposed under the upper box;

b) a rail hanger attached to the chest and located at a back and the top of the chest, the rail hanger removably hooking the chest to the upper rail of the guard rail and removably suspending the chest from the upper rail and above the floor of the platform;

c) a pull handle attached to a top of the rail hanger;

d) a pair of wheels coupled to a bottom and the back of the chest;

e) the toolbox device having a height greater than 35 inches and less than 48 inches from an inside top of the rail hanger to a bottom of the pair of wheels with the chest extending a majority of a height of the guard rail with the pair of wheels suspended above the floor of the platform when the chest is suspended from the upper rail; and f) a rod slidable out of an aperture in the lateral side of the chest.

22. A toolbox device in combination with an aerial work platform having a floor and a guard rail with an upper rail, the toolbox device comprising:

a) a chest having an upper box with a pivotal lid having a lid top defining a top of the chest and at least one lower tray disposed under the upper box;

b) a rail hanger attached to the chest and located at a back and the top of the chest, the rail hanger removably hooking the chest to the upper rail of the guard rail and removably suspending the chest from the upper rail and above the floor of the platform;

c) a pull handle attached to a top of the rail hanger;

d) a pair of wheels coupled to a bottom and the back of the chest;

e) the toolbox device having a height greater than 35 inches and less than 48 inches from an inside top of the rail hanger to a bottom of the pair of wheels with the chest extending a majority of a height of the guard rail with the pair of wheels suspended above the floor of the platform when the chest is suspended from the upper rail; and f) a safety chain with a clip attached thereto with one end of the chain coupled to the chest or the rail hanger and extendable around the upper rail with the clip attached to the end of the chain, the chest or the rail hanger.

23. A toolbox device in combination with an aerial work platform having a floor and a guard rail with an upper rail, the toolbox device comprising:

a) a chest having an upper box with a pivotal lid having a lid top defining a top of the chest and at least one lower tray disposed under the upper box;

b) a rail hanger attached to the chest and located at a back and the top of the chest, the rail hanger removably hooking the chest to the upper rail of the guard rail and removably suspending the chest from the upper rail and above the floor of the platform;

c) a pull handle attached to a top of the rail hanger;

d) a pair of wheels coupled to a bottom and the back of the chest;

e) the toolbox device having a height greater than 35 inches and less than 48 inches from an inside top of the rail hanger to a bottom of the pair of wheels with the chest extending a majority of a height of the guard rail with the pair of wheels suspended above the floor of the platform when the chest is suspended from the upper rail; and f) wherein the lid of the box is pivotally coupled to a top and rear edge of the rail hanger, and is pivotal between: a closed position over the box, and an open position hanging vertically from the rail hanger behind the box.

* * * * *